United States Patent
Sawai et al.

(10) Patent No.: US 10,686,975 B2
(45) Date of Patent: Jun. 16, 2020

(54) INFORMATION PROCESSING APPARATUS AND CONTROL METHOD

(71) Applicant: SONY CORPORATION, Tokyo (JP)

(72) Inventors: Shunichiroh Sawai, Kanagawa (JP); Toru Amano, Tokyo (JP); Yuya Hirano, Tokyo (JP); Yasuyuki Koga, Kanagawa (JP); Satoshi Suzuno, Tokyo (JP); Miki Tokitake, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/077,778

(22) PCT Filed: Feb. 20, 2017

(86) PCT No.: PCT/JP2017/006076
§ 371 (c)(1),
(2) Date: Aug. 14, 2018

(87) PCT Pub. No.: WO2017/150239
PCT Pub. Date: Sep. 8, 2017

(65) Prior Publication Data
US 2019/0052784 A1    Feb. 14, 2019

(30) Foreign Application Priority Data

Mar. 3, 2016   (JP) ................. 2016-040948

(51) Int. Cl.
*H04N 5/225*    (2006.01)
*G06F 1/16*    (2006.01)
(Continued)

(52) U.S. Cl.
CPC ........... *H04N 5/2259* (2013.01); *G06F 1/163* (2013.01); *G06F 1/1686* (2013.01); *G06F 3/011* (2013.01);
(Continued)

(58) Field of Classification Search
CPC ............. H04N 5/2259; H04N 5/23296; H04N 5/23222; H04N 5/2252; H04N 5/23245;
(Continued)

(56) References Cited

U.S. PATENT DOCUMENTS 6,429,895 B1    8/2002   Onuki
10,024,679 B2 *  7/2018   Moore ................. H04N 13/239
(Continued)

FOREIGN PATENT DOCUMENTS

EP    1898634 A2   3/2008
EP    2048875 A2   4/2009
(Continued)

OTHER PUBLICATIONS

International Search Report and Written Opinion of PCT Application No. PCT/JP2017/006076, dated Jun. 6, 2017, 09 pages of ISRWO.

*Primary Examiner* — Jason A Flohre
(74) *Attorney, Agent, or Firm* — Chip Law Group

(57) ABSTRACT

There is provided an information processing apparatus including an acquisition unit configured to acquire activity information associated with a user situation; and a control unit configured to control a capture angle of an image based on the activity information associated with the user situation.

17 Claims, 37 Drawing Sheets

(51) Int. Cl.
*G06F 3/16* (2006.01)
*G06F 3/03* (2006.01)
*G06F 3/01* (2006.01)
*H04N 5/232* (2006.01)
*G06F 3/0346* (2013.01)

(52) U.S. Cl.
CPC ............ *G06F 3/0304* (2013.01); *G06F 3/167* (2013.01); *H04N 5/2251* (2013.01); *H04N 5/2252* (2013.01); *H04N 5/23222* (2013.01); *H04N 5/23245* (2013.01); *H04N 5/23296* (2013.01); *G06F 3/0346* (2013.01); *G06F 3/16* (2013.01)

(58) Field of Classification Search
CPC ... H04N 5/2251; G06F 1/1686; G06F 3/0304; G06F 1/163; G06F 1/167; G06F 3/011; G06F 3/16; G06F 3/0346

See application file for complete search history.

(56) References Cited

U.S. PATENT DOCUMENTS

| | | | |
|---|---|---|---|
| 2002/0097324 A1 | 7/2002 | Onuki | |
| 2003/0215010 A1* | 11/2003 | Kashiwa | H04N 5/2251 375/240.02 |
| 2004/0089814 A1* | 5/2004 | Cheatle | H04N 5/23203 250/397 |
| 2005/0231599 A1* | 10/2005 | Yamasaki | H04N 5/2251 348/207.99 |
| 2008/0062297 A1 | 3/2008 | Sako et al. | |
| 2009/0051788 A1* | 2/2009 | Kamada | H04N 5/2251 348/231.99 |
| 2012/0306725 A1* | 12/2012 | Hilkes | G09G 5/00 345/8 |
| 2014/0267615 A1 | 9/2014 | Tapia et al. | |
| 2015/0201181 A1* | 7/2015 | Moore | G06F 3/016 348/47 |
| 2015/0350612 A1* | 12/2015 | Brunson | H04N 5/2251 348/143 |

FOREIGN PATENT DOCUMENTS

| | | |
|---|---|---|
| GB | 2395081 A | 5/2004 |
| GB | 2395615 A | 5/2004 |

* cited by examiner

| Behavioral state | Control of angle of view (photographing direction) | Other control |
|---|---|---|
| Walking (low movement velocity in upright state) | 80 degrees upward from gravity acceleration direction | |
| Running (high movement velocity in upright state) | 90 degrees upward from gravity acceleration direction | Narrower angle of view than in "walking" state (Zoom) |
| Crouching | 30 degrees upward from gravity acceleration direction | Narrow angle of view (Zoom large) |
| Sitting on chair | 45 degrees upward from gravity acceleration direction | Narrow angle of view (Zoom small) |
| Walking up/down stairs ① | Lens-accommodated state (photographing prohibited) | |
| Walking up/down stairs ② | Up: 120 degrees upward from gravity acceleration direction<br>Down: 60 degrees upward from gravity acceleration direction | |
| Walking uphill | 120 degrees upward from gravity acceleration direction | |
| Walking downhill | 60 degrees upward from gravity acceleration direction | |
| Swimming (low movement velocity) | 30 degrees upward from gravity acceleration direction | |
| Swimming (high movement velocity) | 90 degrees upward from gravity acceleration direction | |
| Bicycle (slow) | 50 degrees upward from gravity acceleration direction | |
| Bicycle (fast) | 55 degrees upward from gravity acceleration direction | |
| Automobile (driver's seat) | 85 degrees upward from gravity acceleration direction | Wider angle of view than in "walking" state, may adjust angle in horizontal direction in link with direction of user's head |
| Train, automobile (rear seat) | 85 degrees upward from gravity acceleration direction and 50 degrees in right- or left-hand direction | |

FIG. 19

INFORMATION PROCESSING APPARATUS AND CONTROL METHOD

CROSS REFERENCE TO RELATED APPLICATIONS

This application is a U.S. National Phase of International Patent Application No. PCT/JP2017/006076 filed on Feb. 20, 2017, which claims priority benefit of Japanese Patent Application No. JP 2016-040948 filed in the Japan Patent Office on Mar. 3, 2016. Each of the above-referenced applications is hereby incorporated herein by reference in its entirety.

TECHNICAL FIELD

The present technology relates to an information processing apparatus, a control method, and a program, more particularly, to an information processing apparatus, a control method, and a program with which an image having an angle of view corresponding to a user situation can be obtained.

BACKGROUND ART

In recent years, so-called wearable terminals that users are capable of wearing on bodies are attracting attention. The types of wearable terminal include a wristwatch type, a glasses type, a ring type, and the like. There are also wearable terminals that are equipped with a display, a camera, and the like in addition to various sensors such as a gyro sensor and a biological sensor.

Using the wearable terminal, the user can check information displayed on the display or record a so-called lifelog that uses a detection result obtained by the sensor or a photographing result obtained by the camera.

CITATION LIST

Patent Literature

[PTL 1] Japanese Patent Application Laid-open No. 2009-118135

SUMMARY OF INVENTION

Technical Problem

When performing photographing using a wearable terminal equipped with a camera, an angle of view is varied according to a posture of the user wearing the terminal, an environment, and the like.

Further, when a person who is near the user wearing the wearable terminal equipped with a camera notices a presence of the camera, he/she might feel like he/she is being photographed.

The present technology has been made in view of the circumstances as described above and aims at enabling an image having an angle of view corresponding to a user situation to be obtained.

Solution to Problem

According to an embodiment of the present technology, there is provided an information processing apparatus including an acquisition unit configured to acquire activity information associated with a user situation, and a control unit configured to control a capture angle of an image based on the activity information associated with the user situation, wherein the acquisition unit and the control unit are each implemented via at least one processor.

According to another embodiment of the present technology, there is provided an information processing control method, the method including acquiring activity information associated with a user situation, and controlling a capture angle of an image based on the activity information associated with the user situation.

Advantageous Effects of Invention

According to the present technology, an image having an angle of view corresponding to a behavior of a user can be obtained. The behavioral state may correspond to a situation of a user.

It should be noted that the effects described herein are not necessarily limited, and any effect described in the present disclosure may be obtained.

BRIEF DESCRIPTION OF DRAWINGS

FIG. 19 is a diagram showing an example of control information.

DESCRIPTION OF EMBODIMENTS

Figure 1:
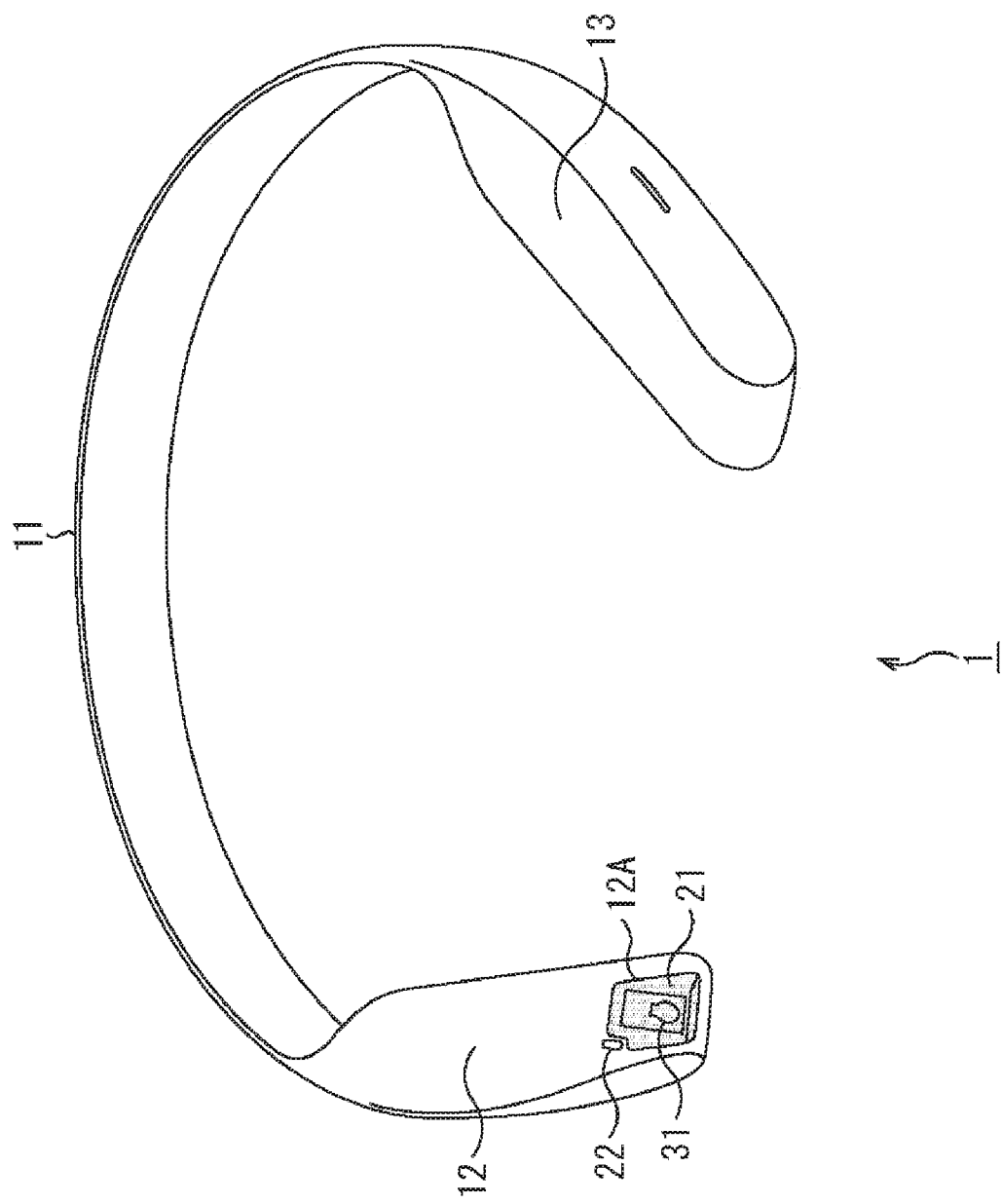
FIG. 1 is a diagram showing a configuration example of an appearance of an information processing terminal according to an embodiment of the present technology.

Hereinafter, embodiments of the present technology will be described.

Descriptions will be given in the following order.
1. Appearance of information processing terminal
2. Configuration of camera block
3. Photographing modes
4. Internal configuration and operations of information processing terminal
5. Modified examples
6. Details of configuration of information processing terminal
7. Others 1. Appearance of Information Processing Terminal FIG. 1 is a diagram showing a configuration example of an appearance of an information processing terminal according to an embodiment of the present technology.

As shown in FIG. 1, the information processing terminal 1 is a wearable terminal that has a substantial-C-shaped outer shape when seen from the front as a whole. The information processing terminal 1 is configured by a right-hand side unit 12 and a left-hand side unit 13 respectively provided on both sides of a band portion 11 obtained by inflecting a thin plate-like member, on inner siders near tip ends thereof.

The right-hand side unit 12 shown on the left-hand side of FIG. 1 includes a casing that is wider than the band portion 11 in a front view and is formed to bulge out from an inner surface of the band portion 11.

On the other hand, the left-hand side unit 13 shown on the right-hand side has a shape substantially symmetrical with the right-hand side unit 12, with respect to a front opening of the band portion 11. Similar to the right-hand side unit 12, the left-hand side unit 13 includes a casing that is wider than the band portion 11 in a front view and is formed to bulge out from the inner surface of the band portion 11.

Figure 2:
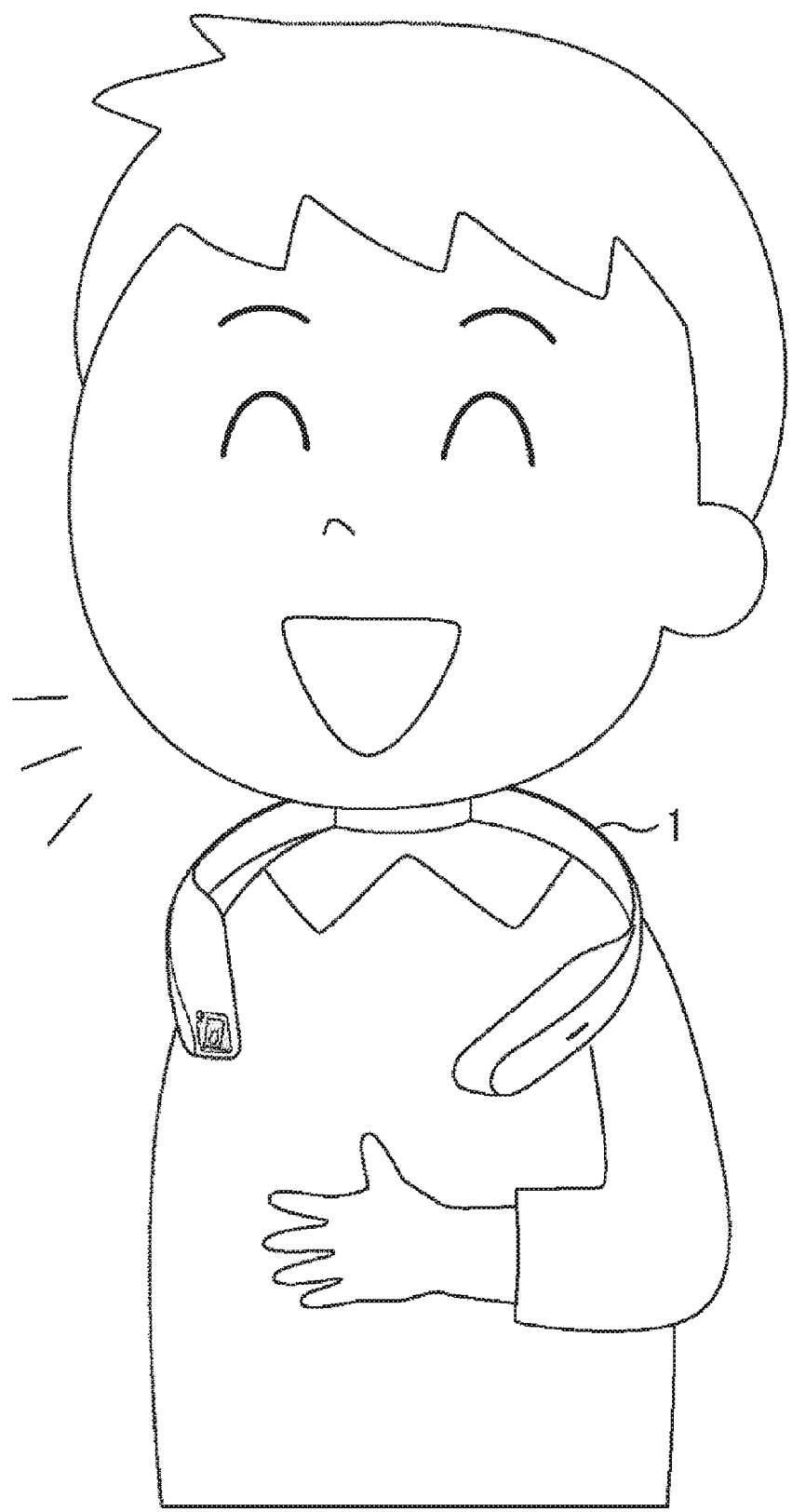
FIG. 2 is a diagram showing a wearing example of the information processing terminal.

The information processing terminal 1 having such an appearance is worn by being hung from a neck as shown in FIG. 2. When worn, an inner side of a deepest portion of the band portion 11 comes into contact with a back of the neck of the user, and the information processing terminal 1 is tilted forwardly. When seen from the user, the right-hand side unit 12 is positioned on the right-hand side of a bottom of a throat of the user, and the left-hand side unit 13 is positioned on the left-hand side of the bottom of the throat of the user.

As will be described later in detail, the information processing terminal 1 includes a photographing function, a music reproduction function, a wireless communication function, a sensing function, and the like.

The user can execute those functions by operating a button provided on the right-hand side unit 12 with, for example, a right hand while wearing the information processing terminal 1 and operating a button provided on the left-hand side unit 13 with, for example, a left hand. The information processing terminal 1 also includes an audio recognition function. The user can also operate the information processing terminal 1 by an utterance.

Music output from a speaker provided in the right-hand side unit 12 by the music reproduction function of the information processing terminal 1 mainly reaches a right ear of the user, and music output from a speaker provided in the left-hand side unit 13 mainly reaches a left ear of the user.

The user can run and ride a bicycle while wearing the information processing terminal 1 and listening to music. It is also possible to cause audio of various types of information such as news acquired via a network to be output instead of music.

As described above, the information processing terminal 1 is a terminal that is assumed to be used during a light exercise. Since the ears are not covered with earphones and the like, the user can listen to ambient sounds and music output from the speakers.

Referring back to FIG. 1, a curve having a circular arc surface is formed at tip ends of the right-hand side unit 12 and the left-hand side unit 13. At the tip end of the right-hand side unit 12, an opening 12A having a substantially vertically-long rectangular shape is formed from a position near the front of the upper surface to an upper position of the curve at the tip end. The opening 12A has a shape in which the upper left corner is dented, and an LED (Light Emitting Diode) 22 is provided at that dented position.

A transparent cover 21 formed of acrylic or the like is fit into the opening 12A. The front surface of the cover 21 is a curve having substantially the same curvature as the curve at the tip end of the left-hand side unit 13. A lens 31 of a camera module provided inside the right-hand side unit 12 is provided at the back of the cover 21. A photographing direction of the camera module is a front direction of the user when seen from the user wearing the information processing terminal 1.

The user wears the information processing terminal 1 so as to be capable of photographing a scenery in the front direction as a moving image or a still image while running or riding a bicycle and simultaneously listening to music as described above. Further, the user can perform such photographing hands free by an audio command as will be described later in detail.

Figure 3:
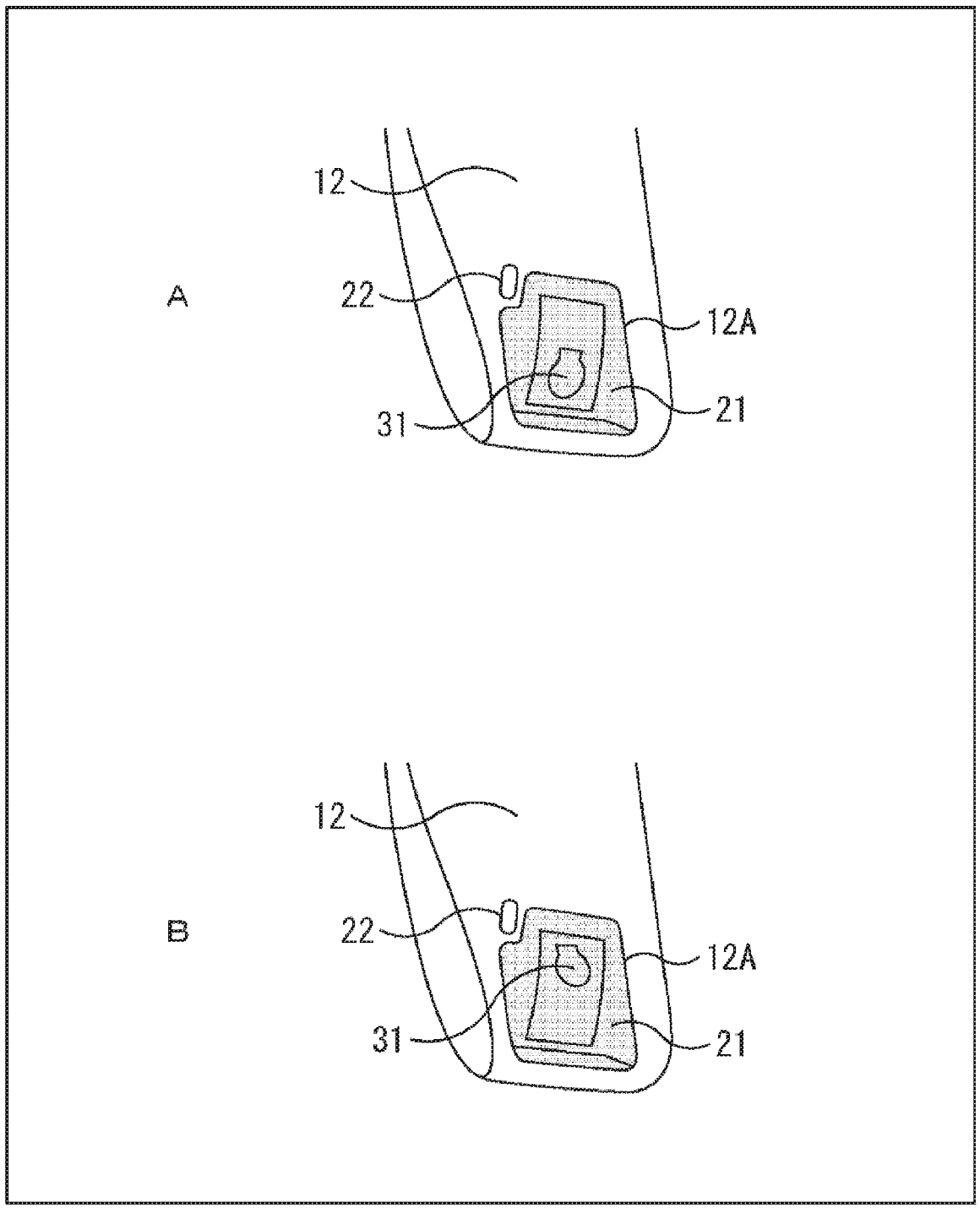
FIGS. 3A and 3B are enlarged diagrams of a tip end of a right-hand side unit.

FIGS. 3A and 3B are enlarged diagrams of the tip end of the right-hand side unit 12.

As shown in FIGS. 3A and 3B, the information processing terminal 1 is capable of controlling an angle of view (photographing range) of an image to be photographed by varying an angle of the lens 31 in a longitudinal direction. FIG. 3A shows a state where the lens 31 is facing downwards, and FIG. 3B shows a state where the lens 31 is facing upwards.

Specifically, the camera module including the lens 31 is attached inside the right-hand side unit 12 in a state where the angle is electrically adjustable.

Figure 4:
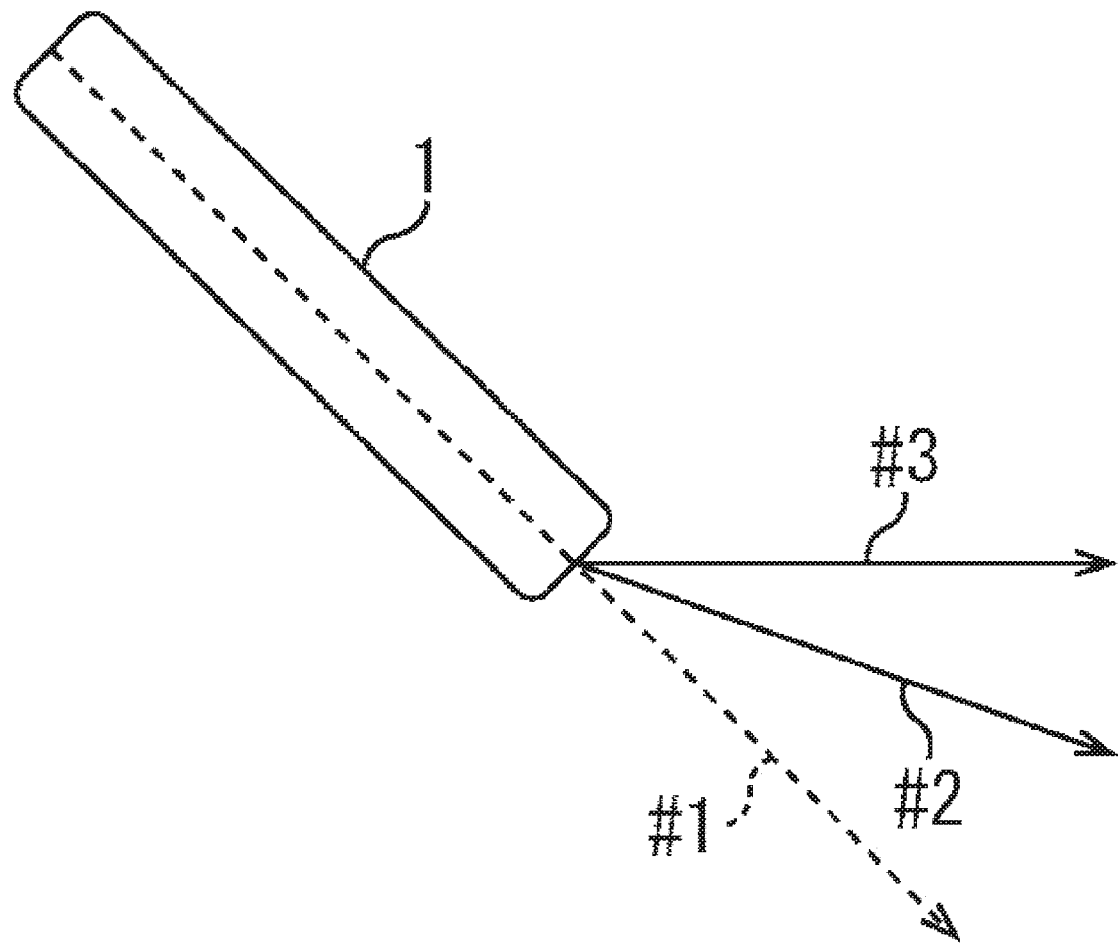
FIG. 4 is a diagram showing a photographing angle.

FIG. 4 is a diagram showing a photographing angle.

The dashed arrow #1 is an arrow passing a center of a side surface (side surface of band portion 11) of the information processing terminal 1. As indicated by solid arrows #2 and #3, the dashed arrow #1 indicating the angle of the lens 31 can be adjusted to an arbitrary angle in the longitudinal direction. The state where the information processing terminal 1 is oblique in FIG. 4 indicates that the information processing terminal 1 is being worn.

Such an angle adjustment function of the camera module is used for obtaining an image having an optimal angle of view according to a behavioral state of the user.

Figure 5:
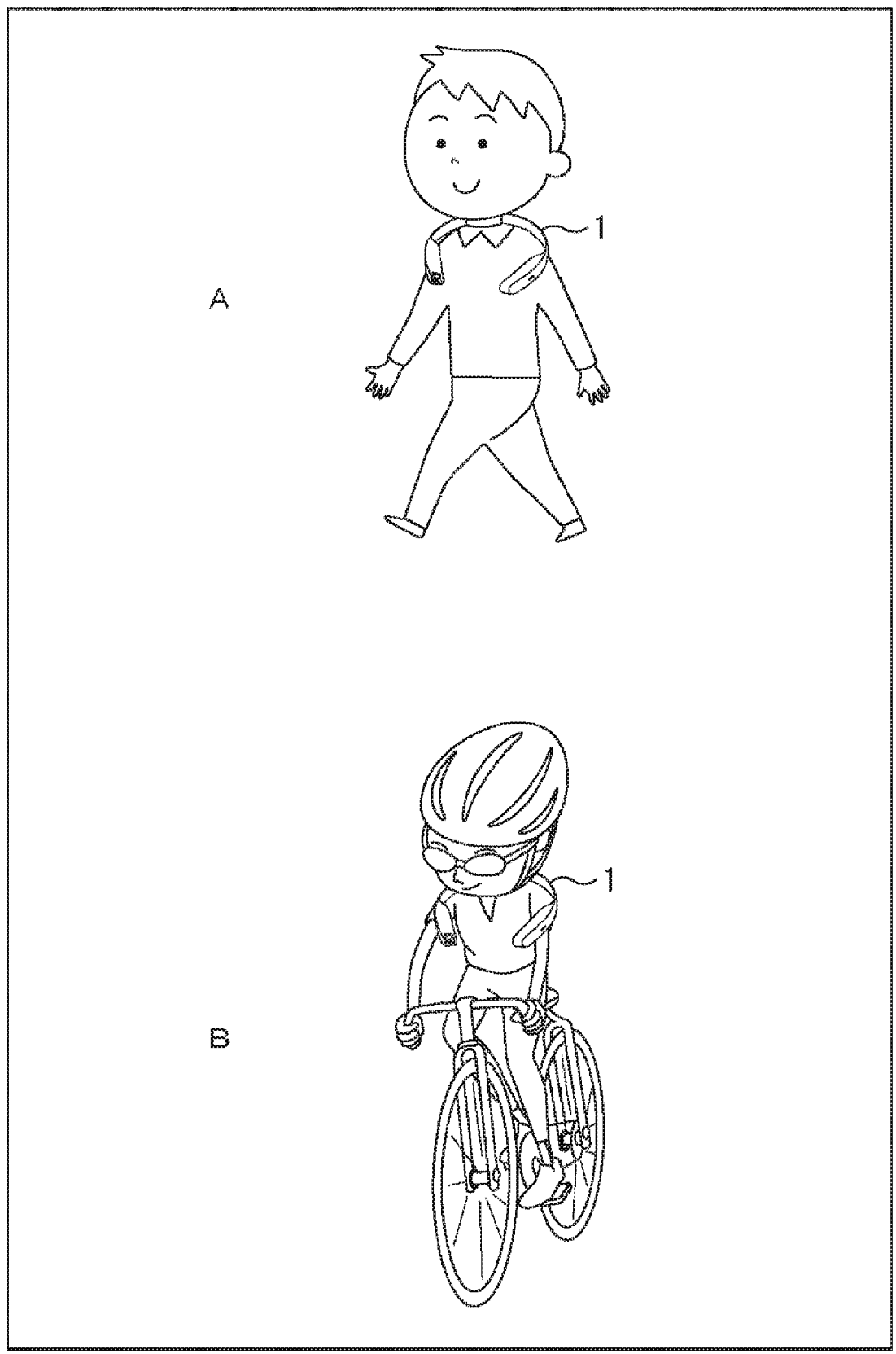
FIGS. 5A and 5B are diagrams for explaining a posture of a user.

FIGS. 5A and 5B are diagrams for explaining a posture of the user wearing the information processing terminal 1.

FIG. 5A shows a walking state, and FIG. 5B shows a state where the user is riding a sports-type bicycle. The angle of the information processing terminal 1 varies depending on the behavioral state of the user wearing the information processing terminal 1.

Specifically, while an upper body of the user in the walking state is substantially upright, the upper body of the user in the bicycle-riding state is tilted forwardly.

The latter posture causes the information processing terminal 1 to tilt forwardly more than the former case. This means that if the angle of the camera module is fixed, the direction of the angle of view varies depending on the behavioral state of the user.

For example, the angle of the camera module is adjusted so as to differ between the walking state and the bicycle-riding state. For each of the behavioral states, the angle of the camera module is set such that an image having an optimal angle of view is obtained. The walking state can also be referred to as upright state. The upright state includes not only the upright walking state but also an upright substantially-stopped state and an upright running state. Moreover, the bicycle-riding state includes not only the state where the user is riding a bicycle but also a state where the user is at a stop while riding on a bicycle.

The information processing terminal 1 acquires a behavioral state of the user (acquires information indicating situation of user) and performs photographing after automatically adjusting the angle of the camera module without requiring a user operation on the basis of the acquired behavioral state. For example, when acquiring information indicating that the user is riding a bicycle, the information processing terminal 1 adjusts the angle of the camera module to the angle indicated by the arrow #3 shown in FIG. 6.

Figure 6:
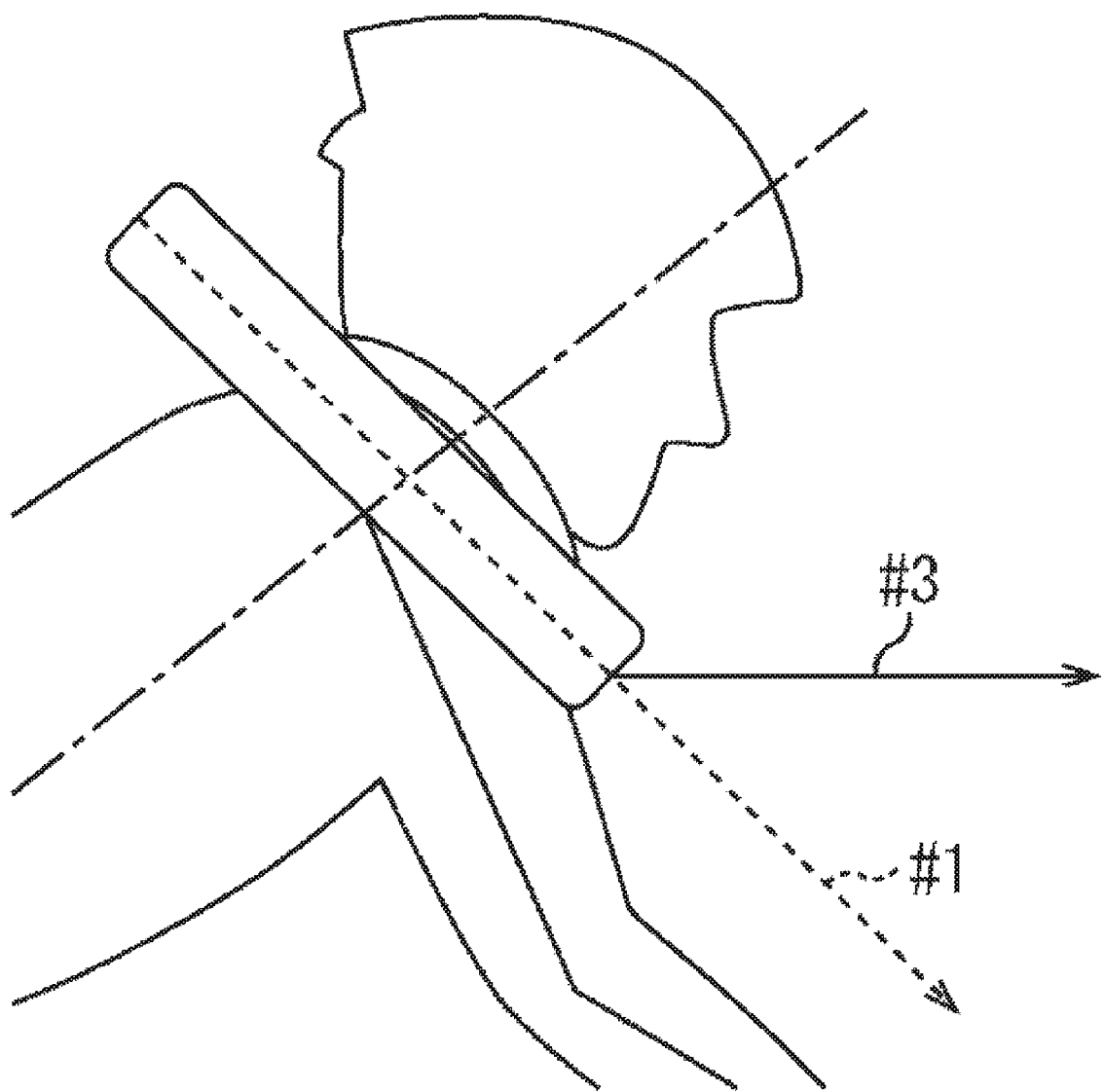
FIG. 6 is another diagram for explaining the posture of a user.

FIG. 6 is a conceptual diagram showing, from the side, an upper body of the user wearing the information processing terminal 1 at the time the user is riding a sports-type bicycle. In this case, assuming that an angle indicated by the dotted arrow #1 is 0 degree, the angle indicated by the arrow #3, which is 50 degrees higher than that, becomes an angle of the camera module requisite for obtaining an image having an optimal angle of view when riding a bicycle.

The behavioral state of the user is acquired by the information processing terminal 1 on the basis of an output of a sensor incorporated in the information processing terminal 1, for example. In the information processing terminal 1, various sensors such as an acceleration sensor, a gyro sensor, an electronic compass, a pressure sensor, and a positioning sensor (GPS) are provided.

As described above, by adjusting the angle of the camera module according to the behavioral state, the information processing terminal 1 can vary a photographing range of an image to be obtained as one unit and acquire an image having an optimal angle of view corresponding to the behavioral state. It should be noted that one unit used herein includes one still image and one frame of a moving image.

Figure 7:
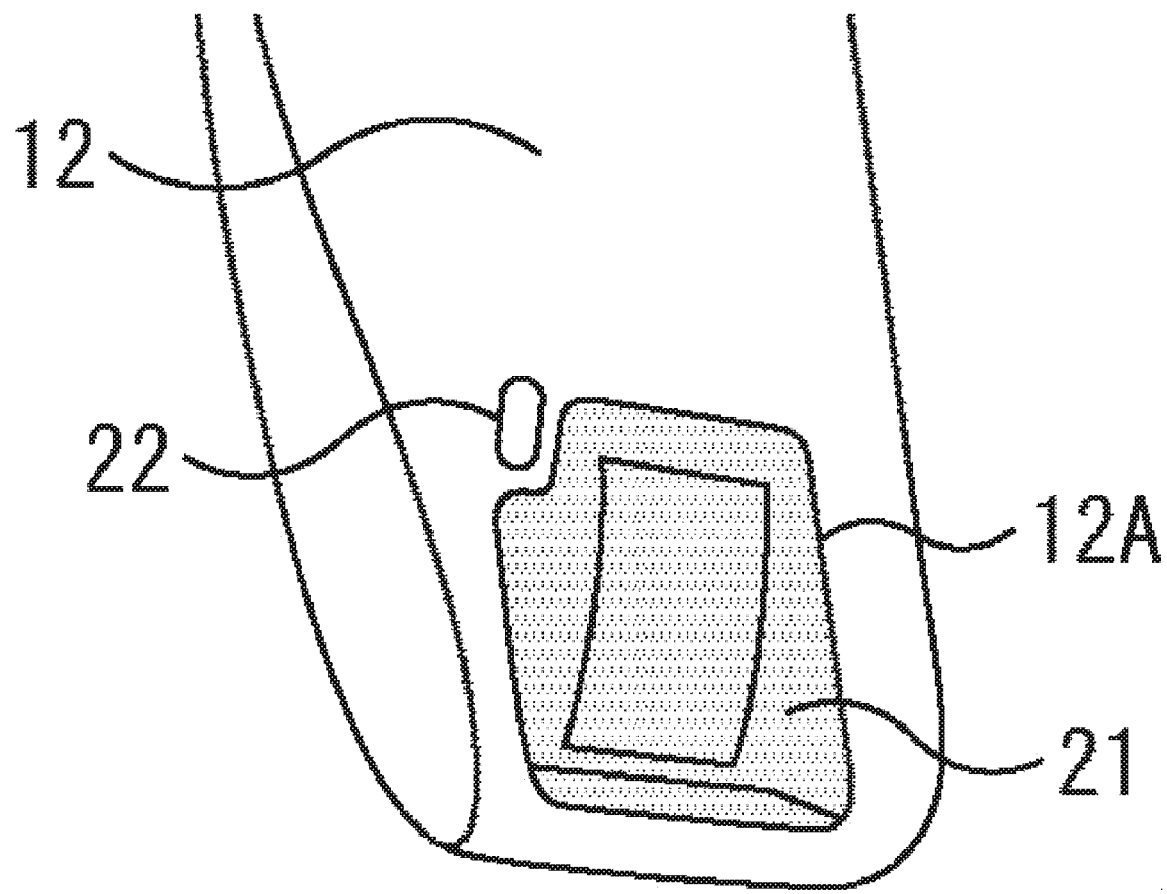
FIG. 7 is an enlarged diagram of the tip end of the right-hand side unit.

Further, when not performing photographing, the information processing terminal 1 can change the angle of the camera module so as to hide the lens 31 as shown in FIG. 7. The state shown in FIG. 7 is a state where the lens 31 is not exposed from the opening 12A, and only the camera cover that rotates integrally with the camera module can be seen from outside.

Accordingly, a person near the user wearing the information processing terminal 1 does not need to be worried as to whether he/she is being photographed. Even when photographing is not performed while the lens 31 is exposed, a person near the user wearing the information processing terminal 1 may be disturbed by the presence of the lens 31. The configuration of hiding the lens 31 when photographing is not performed is a configuration that prevents others from becoming worried while taking privacies into consideration.

The angle of view of an image is controlled by varying the angle of the camera module, that is, an angle of an optical axis of the lens 31. However, when the lens 31 is a zoom lens, the angle of view may be controlled by varying a focal distance of the lens 31. Of course, it is also possible to control the angle of view by varying both the angle of the optical axis and the focal distance. Optically, the photographing range of an image is specified by the angle of the optical axis and focal distance of the lens 31.

2. Configuration of Camera Block

Figure 8:
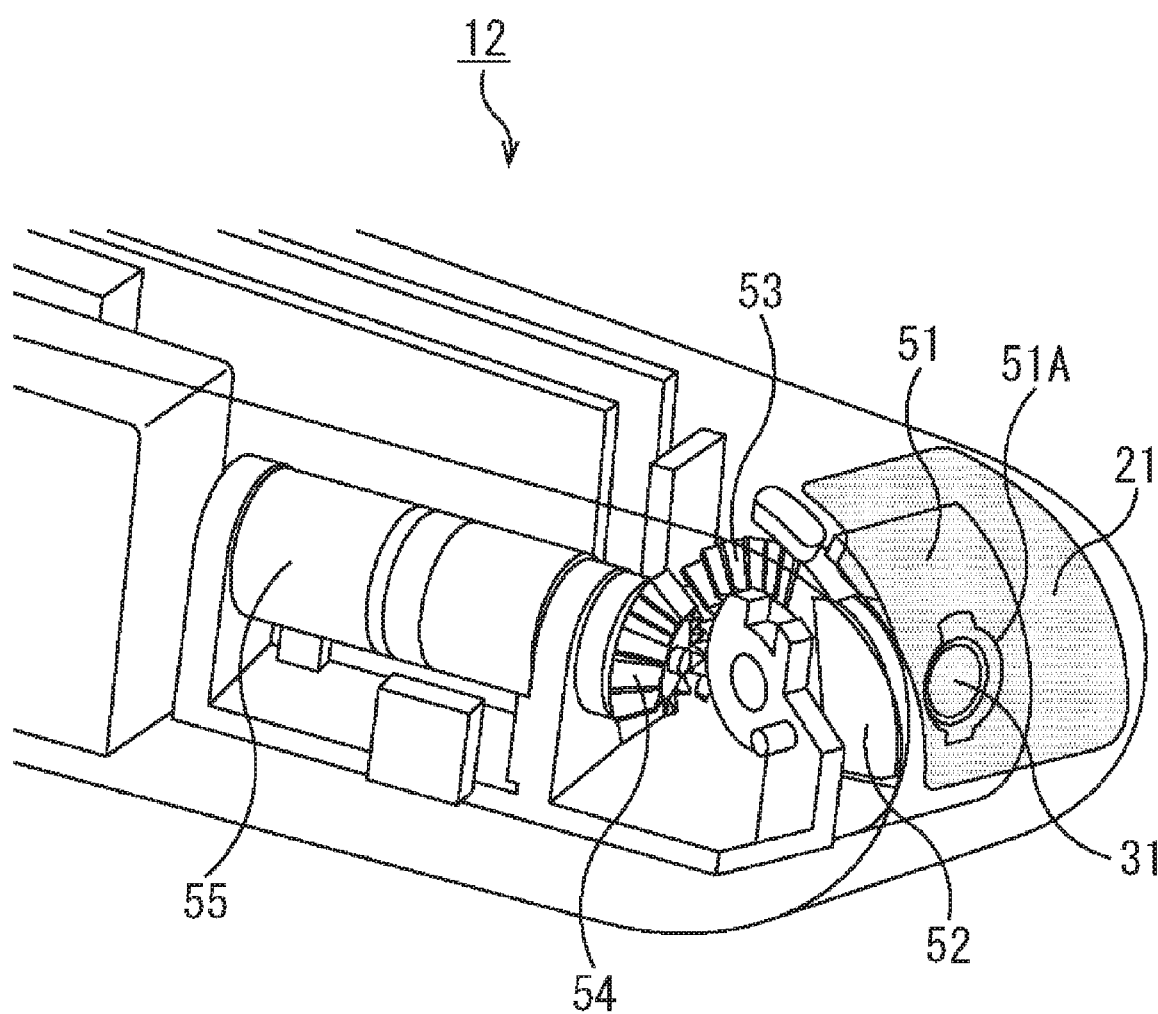
FIG. 8 is a diagram showing a configuration of a camera block.

FIG. 8 is a diagram showing a configuration of the camera block. The camera block includes the camera module, the lens 31, and the like described above.

On an inner side of the cover 21 of the right-hand side unit 12, a camera cover 51 obtained by inflecting a plate-like member is provided. The camera cover 51 is provided to prevent an inside from being exposed from the opening 12A. An opening 51A is formed on the camera cover 51, and the lens 31 appears from the opening 51A. The camera cover 51 rotates as the angle of the camera module 52 is adjusted.

The camera module 52 includes a substantially-cuboid body and is configured by attaching the lens 31 to an upper surface thereof. The camera module 52 is fixed to a frame including a rotary shaft (FIGS. 9A, 9B, and 9C etc.).

Behind the camera module 52, bevel gears 53 and 54 are provided while intermeshing with each other. The bevel gears 53 and 54 transmit power of a subsequent motor 55 to the frame to which the camera module 52 is fixed.

The motor 55 is a stepping motor and causes the bevel gear 54 to rotate according to a control signal. By using the stepping motor, the camera block can be miniaturized. Power generated by the motor 55 is transmitted to the frame to which the camera module 52 is fixed via the bevel gear 54 and the bevel gear 53. As a result, the camera module 52 and the lens 31 and camera cover 51 integrated with the camera module 52 rotate about the shaft of the frame.

Figure 9:
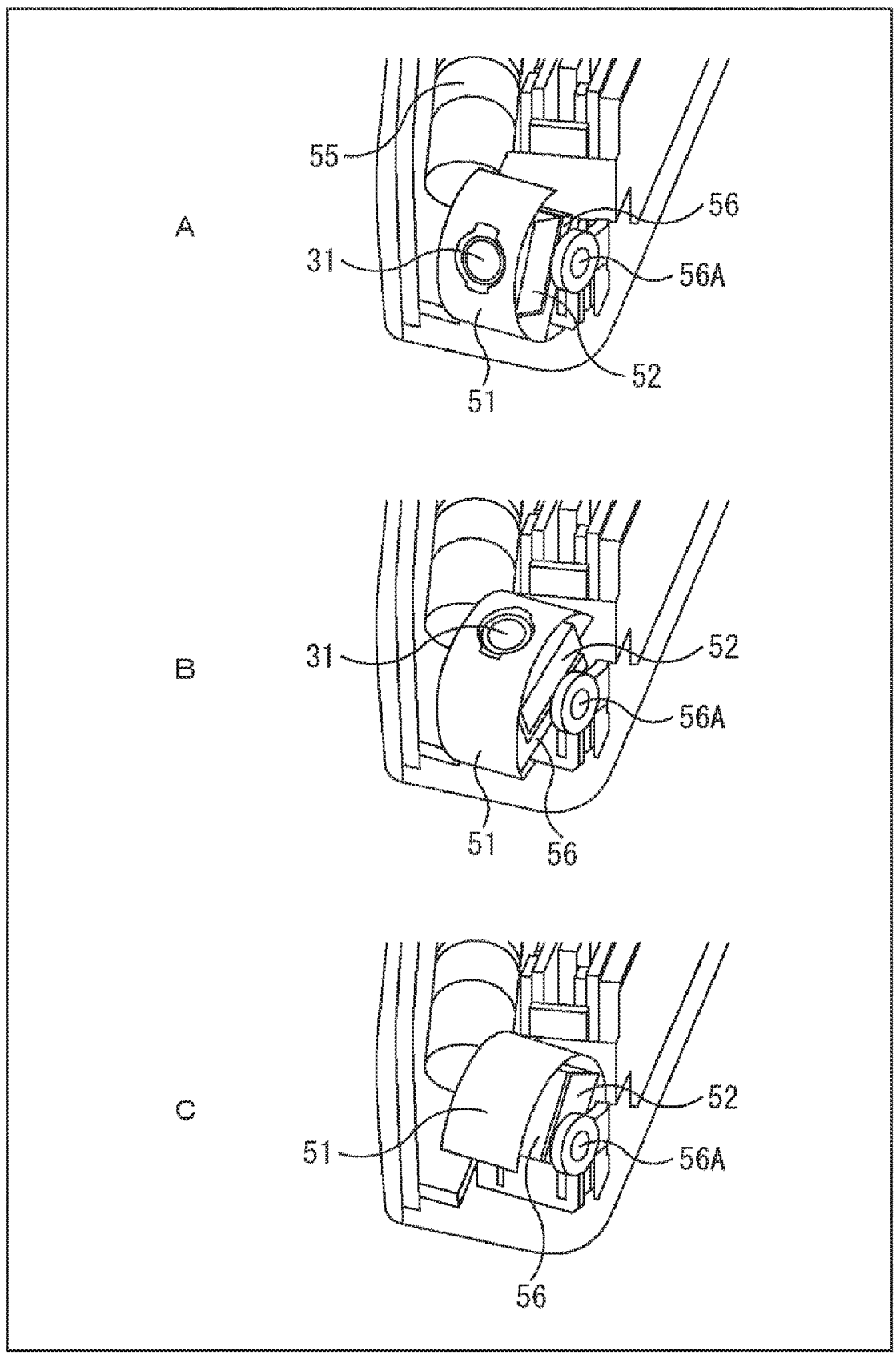
FIGS. 9A, 9B and 9C are perspective views showing the configuration of the camera block.

FIGS. 9A, 9B, and 9C are perspective views showing the configuration of the camera block.

For example, when the user is in the walking state, the angle of the camera module 52 is adjusted to an angle shown in FIG. 9A. The angle shown in FIG. 9A is a maximum rotation angle when a closed state of the camera cover 51 is used as a reference, for example.

Behind the camera module 52, a camera frame 56 that rotates about a shaft 56A is provided. The camera module 52 is attached to the camera frame 56.

When the angle is brought upwards from the state shown in FIG. 9A, the direction of the camera module 52 becomes a state shown in FIG. 9B. For example, when the user is riding a bicycle, the angle of the camera module 52 is adjusted to an angle shown in FIG. 9B. The state shown in FIG. 9B is a state where the angle of the camera module 52 is 50 degrees as described above with reference to FIG. 6.

When the angle is additionally brought higher from the state shown in FIG. 9B to close the camera cover 51, the direction of the camera module 52 becomes a state shown in FIG. 9C. In the state shown in FIG. 9C, only the camera cover 51 can be seen from the opening 12A via the cover 21, and the lens 31 cannot be seen. For example, the drive of the camera module 52 is started from the closed state shown in FIG. 9C.

The angle adjustment of the camera module 52 is carried out as described above. Irrespective of which angle the camera module 52 is at, a distance between an inner surface of the cover 21 and the lens 31 is always the same.

Figure 10:
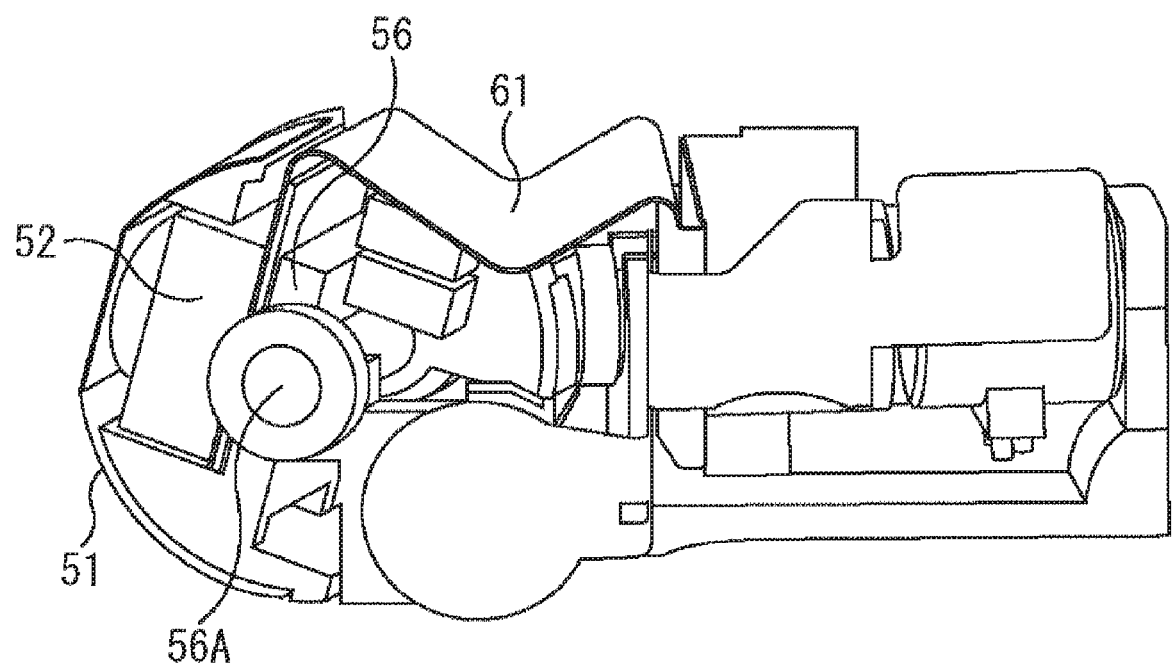
FIG. 10 is a diagram showing the configuration of the camera block from another direction.
Figure 11:
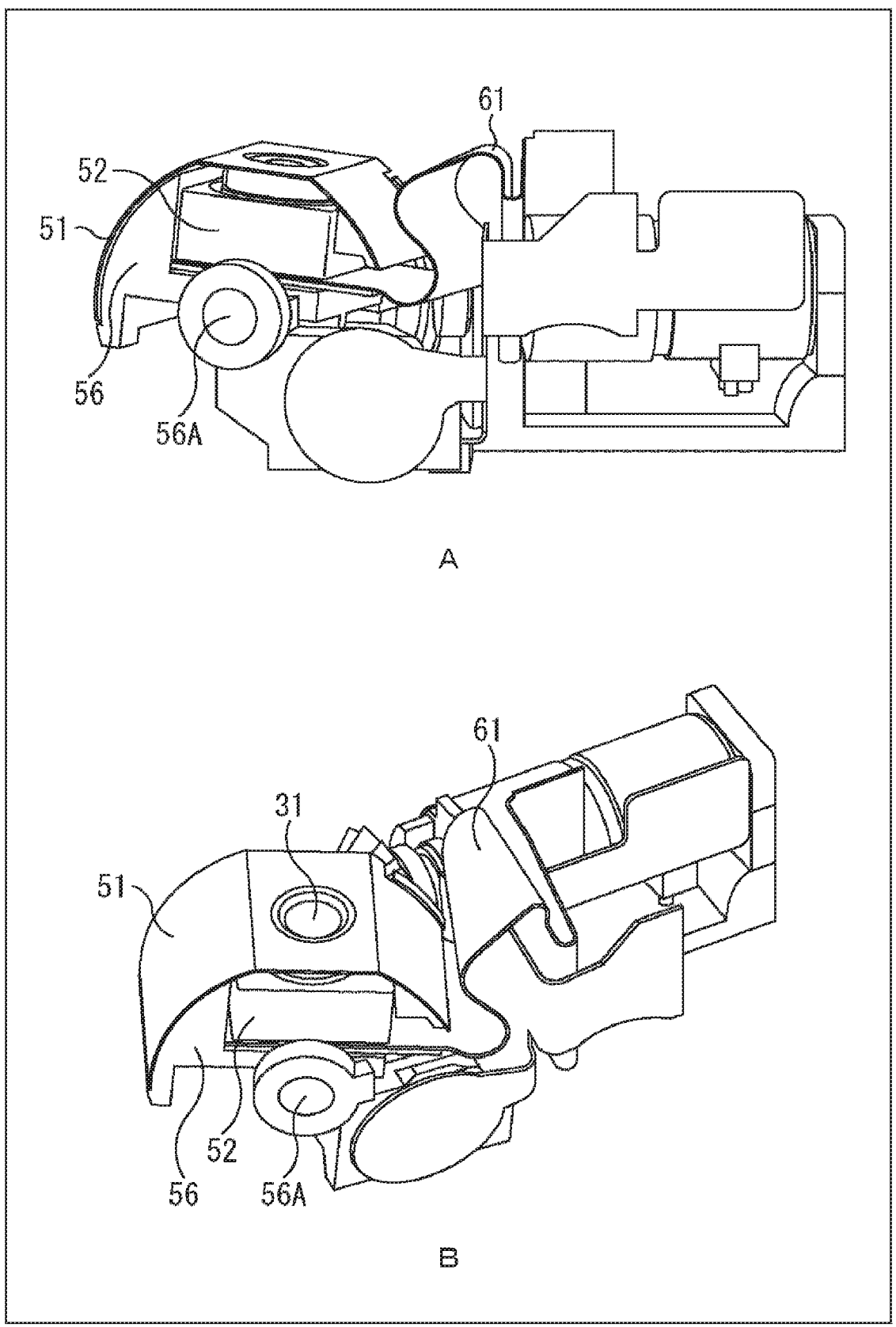
FIGS. 11A and 11B are diagrams showing the configuration of the camera block from other directions.

FIGS. 10, 11A and 11B are each a diagram showing the configuration of the camera block from another direction.

FIG. 10 shows the respective structures at a time the camera module 52 is in the state shown in FIG. 9A.

As shown in FIG. 10, the shape of the camera cover 51 is substantially a semicircle from side view. A flexible wiring 61 is connected to the camera module 52 while passing between the camera cover 51 and the camera frame 56. The flexible wiring 61 is formed of a material having flexibility and used to exchange signals between the camera module 52 and a substrate inside the right-hand side unit 12.

For preventing deterioration and disconnection accompanying the rotation of the camera module 52, the flexible wiring 61 is formed with a length that gives leeway to the distance between the camera module 52 and the substrate. In the state shown in FIG. 10, the flexible wiring 61 is gently valley-folded at a position behind the camera module 52.

FIGS. 11A and 11B shows the respective structures at a time the camera module 52 is in the state shown FIG. 9B.

As shown in FIGS. 11A and 11B, in this case, the camera frame 56 becomes substantially horizontal, and a deflection of the flexible wiring 61 becomes large. As shown in FIG. 11A, the deflection of the flexible wiring 61 substantially takes an S-shape in side view.

Heretofore, the angle of the camera module 52 can be adjusted in only the longitudinal direction, but the angle may be adjustable in the horizontal direction.

3. Photographing Modes

Here, photographing modes of the information processing terminal 1 will be described.

In the information processing terminal 1, photographing modes including, for example, a still image photographing mode, a still image continuous-photographing mode, an interval photographing mode, an auto-photographing mode, and a moving image shooting mode are prepared. The user can select the predetermined photographing mode to start photographing.

<3-1. Example of Still Image Photographing Mode>

Figure 12:
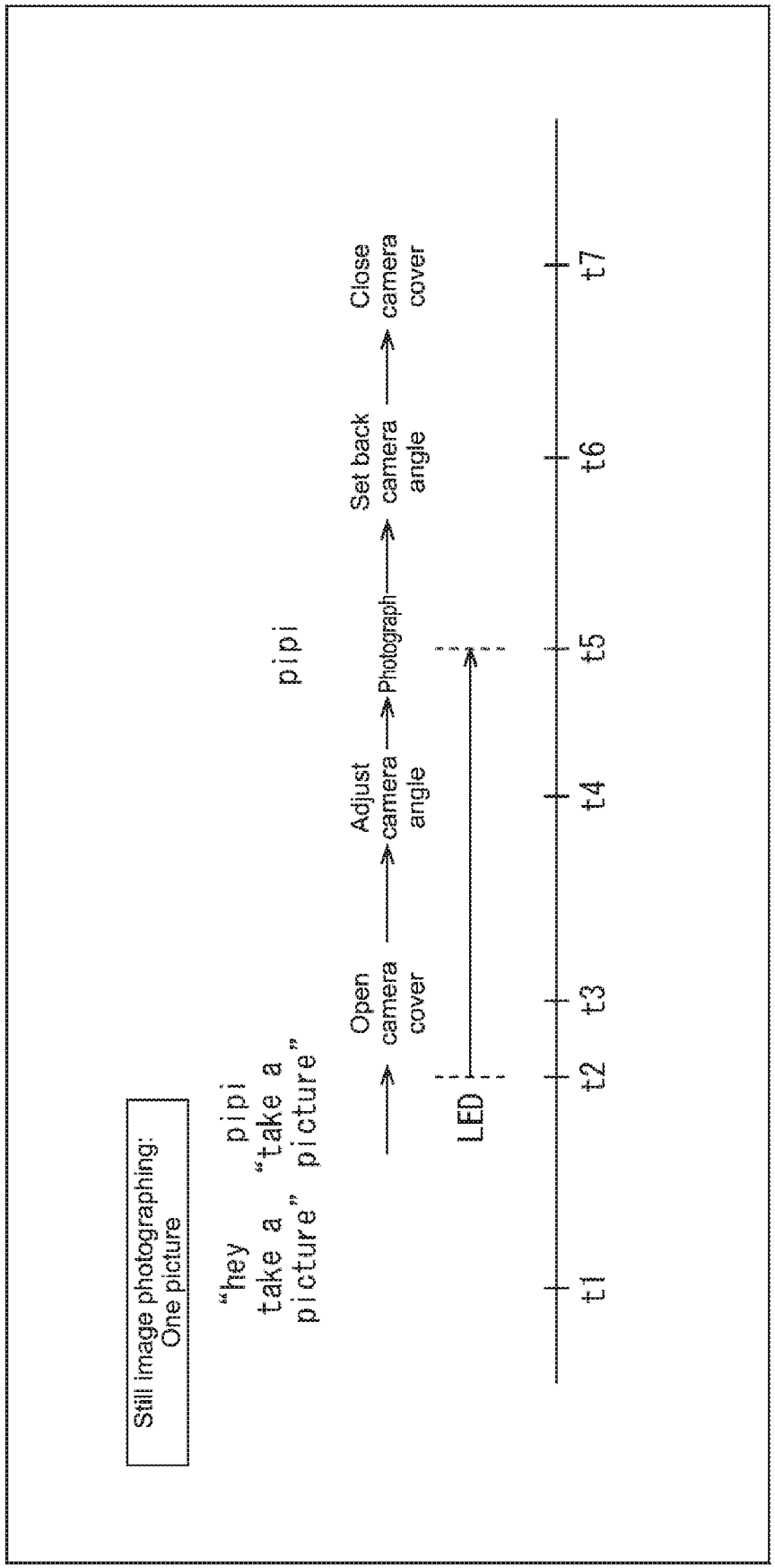
FIG. 12 is a diagram showing an example of a photographing sequence in a still image photographing mode.

FIG. 12 is a diagram showing an example of a photographing sequence in the still image photographing mode.

The still image photographing mode is a mode of photographing a still image once. The abscissa axis of FIG. 12 represents a time. The same holds true for FIG. 13 and subsequent figures.

At a time t1, the information processing terminal 1 detects an audio command that becomes a trigger of the still image photographing mode on the basis of user audio collected using a microphone. In the example shown in FIG. 12, the audio as the trigger of the still image photographing mode is "hey take a picture". In other words, without operating buttons, the user can activate the still image photographing mode by audio.

When detecting an audio command as a trigger of the still image photographing mode, the information processing terminal 1 causes audio such as "take a picture" to be output from a speaker with sound effects at a time t2. The information processing terminal 1 also starts light emission of the LED 22. The light emission of the LED 22 is continued to a time t5. The light emission of the LED 22 is used to notify the user and those around the user that photographing is being performed.

At a time t3, the information processing terminal 1 opens the camera cover 51. By rotating the camera module 52 and opening the camera cover 51, the information processing terminal 1 sets the camera module 52 to an initial state. By opening the camera cover 51, the lens 31 can be seen from outside.

At a time t4, the information processing terminal 1 adjusts the angle of the camera module 52. Specifically, the information processing terminal 1 acquires a behavioral state of the user on the basis of detection results obtained by the various sensors. The information processing terminal 1 also adjusts the angle of the camera module 52 according to the acquired behavioral state.

It should be noted that the angle of the camera module 52 may be adjusted such that the direction of the optical axis of the lens 31 constantly becomes horizontal. In this case, the information processing terminal 1 detects a posture of the information processing terminal 1 using an acceleration sensor, a gyro sensor, and the like and adjusts the angle of the camera module 52 according to the detected posture.

At the time t5, the information processing terminal 1 controls the camera module 52 to perform photographing. The information processing terminal 1 outputs sound effects from the speaker along with the photographing. Since the angle of the camera module 52 is adjusted to an angle corresponding to the behavioral state, an image acquired by the photographing becomes an image having an optimal angle of view. The information processing terminal 1 stores the photographed image (still image) in an internal memory.

At a time t6, the information processing terminal 1 sets back the angle of the camera module 52 and closes the camera cover 51 at a time t7. By closing the camera cover 51, the lens 31 cannot be seen from outside.

The photographing in the still image photographing mode is performed as described above using user utterances as a trigger. By uttering voices while riding a bicycle, for example, the user can photograph a scenery in the front direction while running.

<3-2. Example of Still Image Continuous-Photographing Mode>

Figure 13:
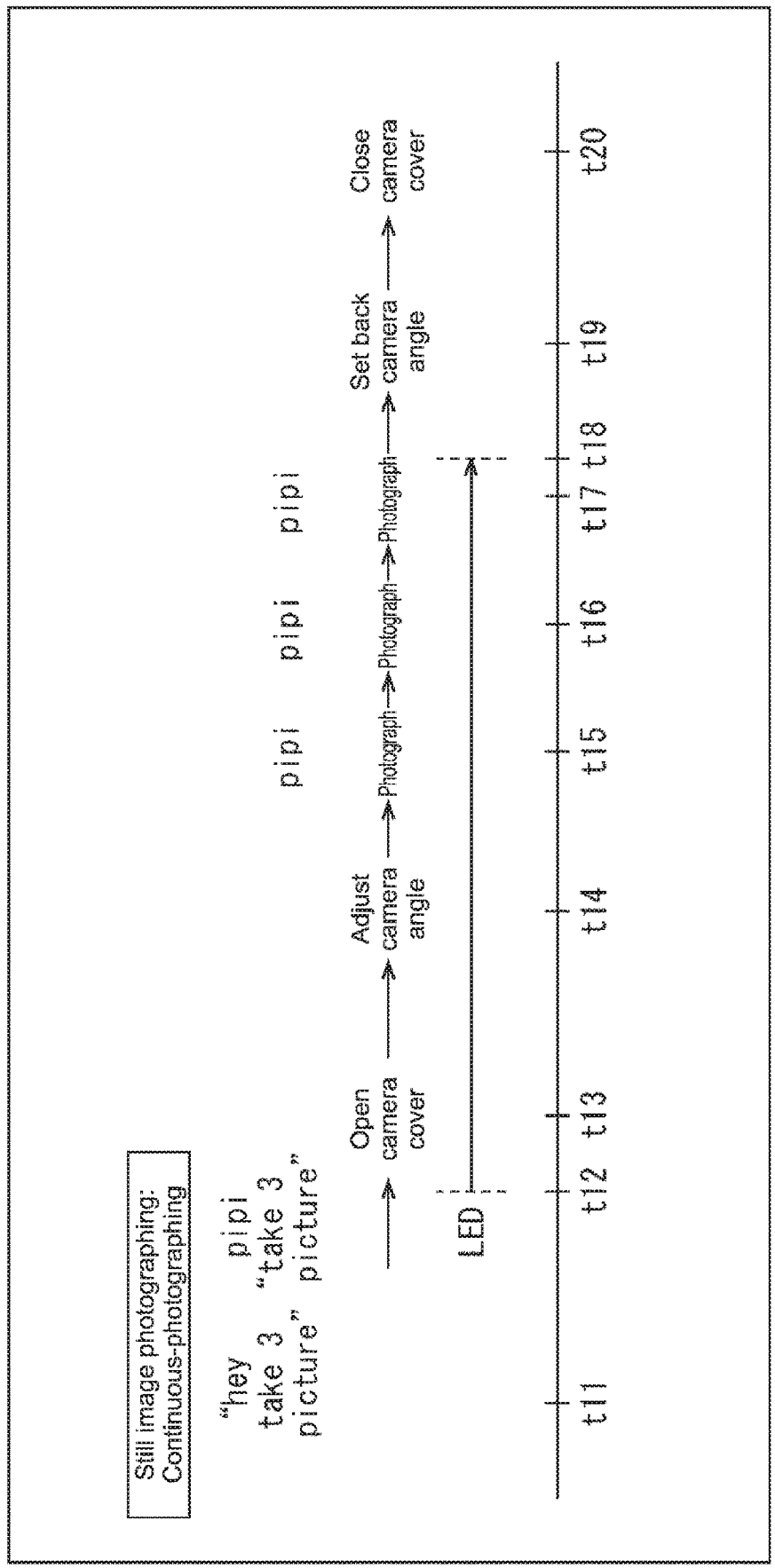
FIG. 13 is a diagram showing an example of a photographing sequence in a still image continuous-photographing mode.

FIG. 13 is a diagram showing an example of a photographing sequence in the still image continuous-photographing mode.

The still image continuous-photographing mode is a mode of consecutively photographing a still image three times.

At a time t11, the information processing terminal 1 detects an audio command that becomes a trigger of the still image continuous-photographing mode on the basis of user audio. In the example shown in FIG. 13, the audio as the trigger of the still image continuous-photographing mode is "hey take 3 picture".

When detecting an audio command as a trigger of the still image continuous-photographing mode, the information processing terminal 1 causes audio such as "take 3 picture" to be output from the speaker with sound effects at a time t12. The information processing terminal 1 also starts light emission of the LED 22.

The light emission of the LED 22 is continued until a time t18 at which third photographing ends.

At a time t13, the information processing terminal 1 opens the camera cover 51.

At a time t14, the information processing terminal 1 acquires a behavioral state of the user and adjusts the angle of the camera module 52.

At a time t15, the information processing terminal 1 controls the camera module 52 to perform first photographing. The information processing terminal 1 also outputs sound effects from the speaker along with the photographing. The information processing terminal 1 stores the first photographed image in the internal memory.

At times t16 and t17, the information processing terminal 1 performs second and third photographing, respectively. The information processing terminal 1 stores the second and third photographed images in the internal memory. For example, the respective photographing are performed at certain time intervals.

The information processing terminal 1 sets back the angle of the camera module 52 at a time t19 and closes the camera cover 51 at a time t20.

The third photographing in the still image continuous-photographing mode is performed as described above using user utterances as a trigger. Photographing may be performed 4 times or more in the still image continuous-photographing mode. The photographing may also be repeated for the number of times instructed by user utterances.

<3-3. Example of Interval Photographing Mode>

Figure 14:
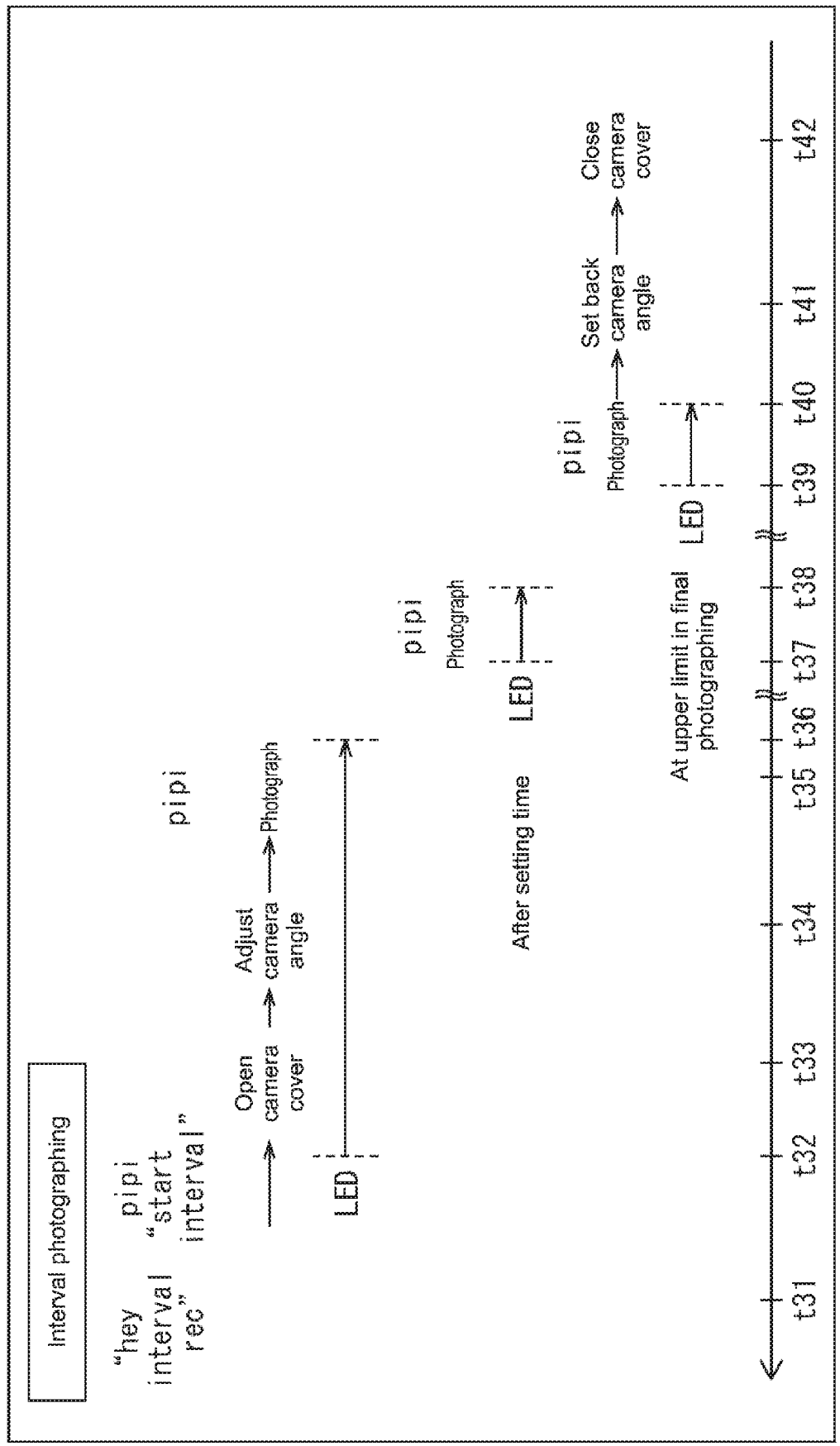
FIG. 14 is a diagram showing an example of a photographing sequence in an interval photographing mode.

FIG. 14 is a diagram showing an example of a photographing sequence in the interval photographing mode.

The interval photographing mode is a mode of repetitively photographing a set number of still images at regular time intervals. The photographing interval and photographing number are set in advance.

At a time t31, the information processing terminal 1 detects an audio command that becomes a trigger of the interval photographing mode on the basis of user audio. In the example shown in FIG. 14, the audio as the trigger of the interval photographing mode is "hey interval rec".

When detecting an audio command as a trigger of the interval photographing mode, the information processing terminal 1 causes audio such as "start interval" to be output from the speaker with sound effects at a time t32. The information processing terminal 1 also starts light emission of the LED 22. The light emission of the LED 22 is continued until a time t36 at which first photographing ends.

At a time t33, the information processing terminal 1 opens the camera cover 51.

At a time t34, the information processing terminal 1 acquires a behavioral state of the user and adjusts the angle of the camera module 52.

At a time t35, the information processing terminal 1 controls the camera module 52 to perform first photographing. The information processing terminal 1 also outputs sound effects from the speaker along with the photographing. The information processing terminal 1 stores the first photographed image in the internal memory.

At a time t37 after the setting time, the information processing terminal 1 performs second photographing. The information processing terminal 1 stores the photographed image in the internal memory. The information processing terminal 1 also causes the LED 22 to emit light until a time t38 at which the photographing ends. The photographing as described above is repeated at predetermined time intervals.

The angle of the camera module 52 in the second and subsequent photographing may be the same as that of the first photographing or may be readjusted according to the behavioral state of the user at the time of photographing.

At a time t39, the information processing terminal 1 performs final photographing. The information processing terminal 1 stores the image obtained by the final photographing in the internal memory. The information processing terminal 1 also causes the LED 22 to emit light until a time t40 at which the photographing ends.

The information processing terminal 1 sets back the angle of the camera module 52 at a time t41 and closes the camera cover 51 at a time t42.

The plurality of times of photographing in the interval photographing mode are performed as described above using user utterances as a trigger. Using the interval photographing mode, the user can photograph sceneries at predetermined time intervals.

<3-4. Example of Auto-Photographing Mode>

Figure 15:
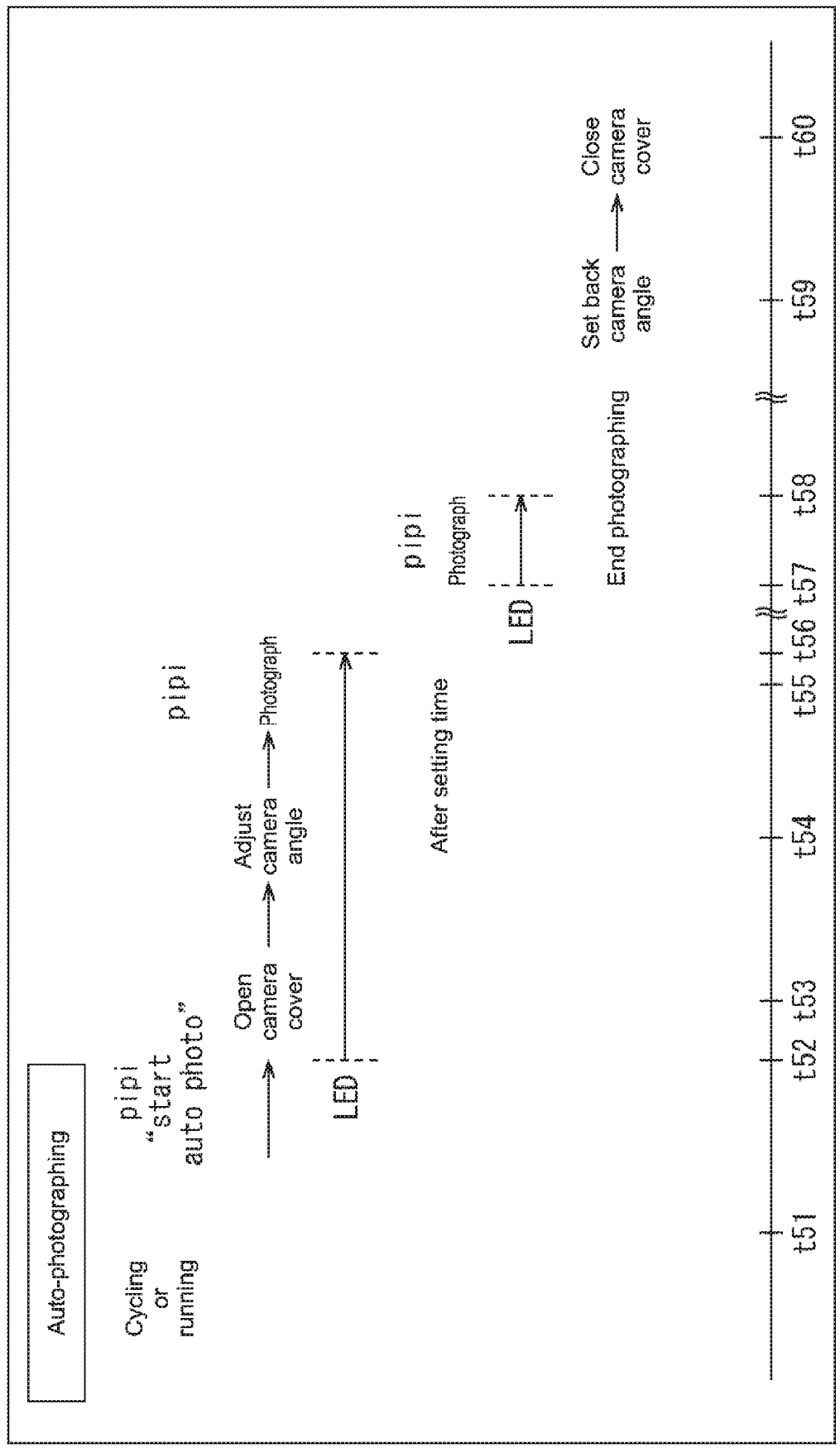
FIG. 15 is a diagram showing an example of a photographing sequence in an auto-photographing mode.

FIG. 15 is a diagram showing an example of a photographing sequence in the auto-photographing mode.

The auto-photographing mode is a mode in which photographing is started when a predetermined behavioral state is acquired. The photographing interval and photographing number are set in advance. Further, types of behavioral state to become triggers for photographing in the auto-photographing mode are also set in advance. When the auto-photographing mode is set, the information processing terminal 1 repetitively carries out processing of acquiring a behavioral state of the user.

At a time t51, the information processing terminal 1 acquires, as the behavioral state of the user, a preset behavioral state such as a cycling (riding a bicycle) state and a running state. Accordingly, photographing in the auto-photographing mode is started. The user can start photographing by merely taking a predetermined behavior.

When acquiring a behavioral state as a trigger of the interval photographing mode, the information processing terminal 1 causes audio such as "start auto photo" to be output from the speaker with sound effects at a time t52. The information processing terminal 1 also starts light emission of the LED 22. The light emission of the LED 22 is continued until a time t56 at which first photographing ends.

At a time t53, the information processing terminal 1 opens the camera cover 51.

At a time t54, the information processing terminal 1 adjusts the angle of the camera module 52 according to the behavioral state of the user specified at the time t51.

At a time t55, the information processing terminal 1 controls the camera module 52 to perform first photographing. The information processing terminal 1 also outputs sound effects from the speaker along with the photographing. The information processing terminal 1 stores the first photographed image in the internal memory.

At a time t57 after the setting time, the information processing terminal 1 performs second photographing. The information processing terminal 1 stores the photographed image in the internal memory. The information processing terminal 1 also causes the LED 22 to emit light until a time t58 at which the photographing ends. The photographing as described above is repeated at predetermined time intervals.

For example, when a behavioral state different from that acquired at the time t51 is acquired as the behavioral state of the user, the photographing in the auto-photographing mode ends.

When a behavioral state different from that specified at the time t51 is acquired, the information processing terminal 1 sets back the angle of the camera module 51 at a time t59 and closes the camera cover 51 at a time t60.

The photographing in the auto-photographing mode is performed as described above using the behavioral state of the user as a trigger. By taking a preset behavior such as riding a bicycle, the user can repetitively photograph sceneries while that behavior is taken.

<3-5. Example of Moving Image Shooting Mode>

Figure 16:
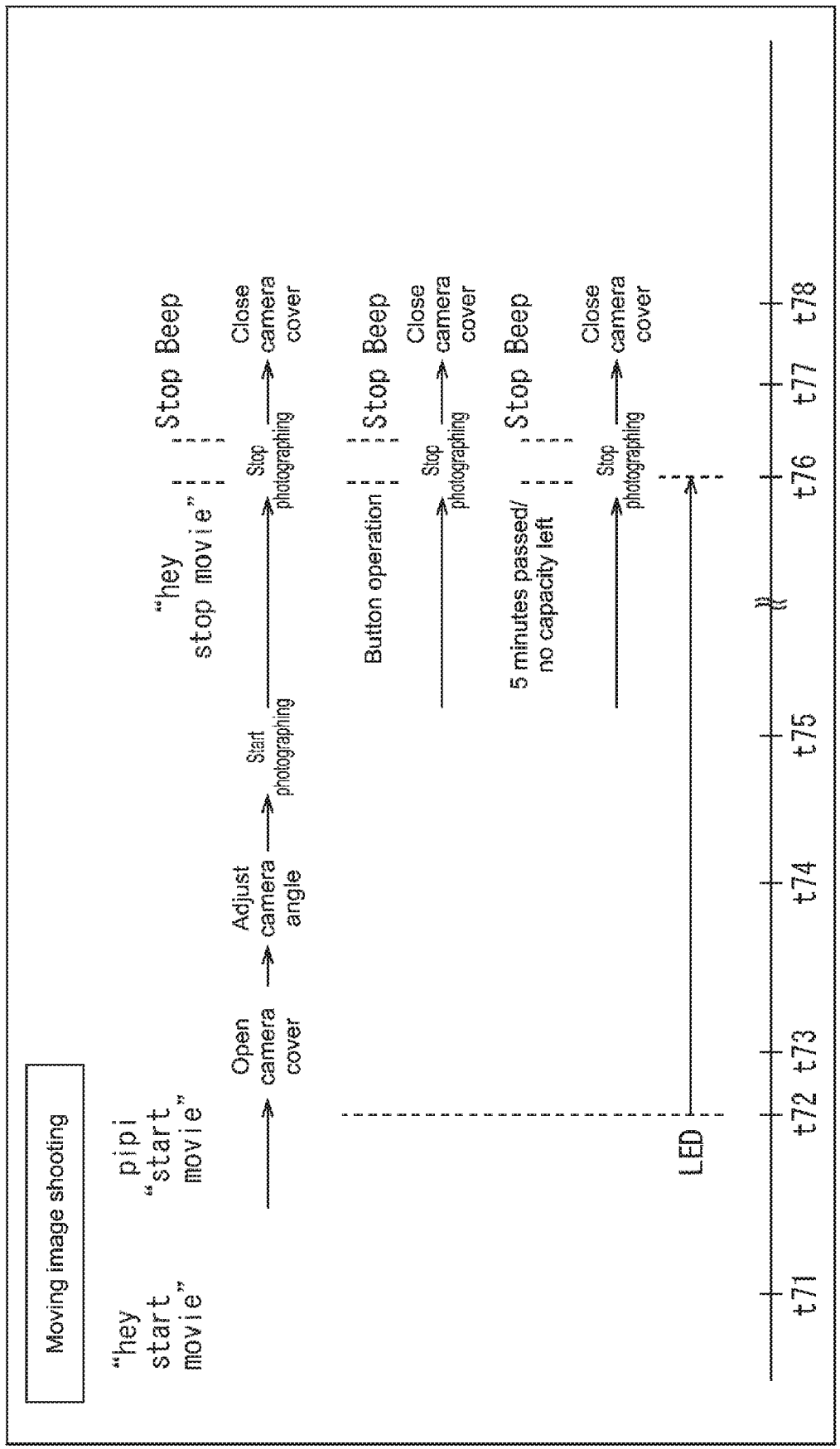
FIG. 16 is a diagram showing an example of a photographing sequence in a moving image shooting mode.

FIG. 16 is a diagram showing an example of a photographing sequence in the moving image shooting mode.

At a time t71, the information processing terminal 1 detects an audio command that becomes a trigger of the moving image shooting mode on the basis of user audio. In the example shown in FIG. 16, the audio as the trigger of the moving image shooting mode is "hey start movie".

When detecting an audio command as a trigger of the moving image shooting mode, the information processing terminal 1 causes audio such as "start movie" to be output from the speaker with sound effects at a time t72. The information processing terminal 1 also starts light emission of the LED 22. The light emission of the LED 22 is continued until a time t76 at which shooting of a moving image ends.

At a time t73, the information processing terminal 1 opens the camera cover 51.

At a time t74, the information processing terminal 1 acquires a behavioral state of the user and adjusts the angle of the camera module 52. The shooting of a moving image is carried out after the angle of the camera module 52 is adjusted to an angle corresponding to the behavioral state of the user.

At a time t75, the information processing terminal 1 controls the camera module 52 to start shooting a moving image. The information processing terminal 1 successively stores the shot moving image in the internal memory.

At the time t76, the information processing terminal 1 detects an audio command such as "hey stop movie" to end shooting of a moving image on the basis of user audio collected using a microphone.

When a predetermined button provided on the information processing terminal 1 is operated, when shooting of a moving image is continued for a predetermined time such as 5 minutes, or when there is no capacity left in the internal memory, shooting of a moving image is similarly ended.

The information processing terminal 1 sets back the angle of the camera module 52 at a time t77 and closes the camera cover 51 at a time t78.

The shooting of a moving image in the moving image shooting mode is performed as described above using user utterances as a trigger. By uttering voices while riding a bicycle, for example, the user can shoot a moving image of a scenery in the front direction while riding.

4.4. Internal Configuration and Operations of Information Processing Terminal

<4-1. Internal Configuration of Information Processing Terminal 1>

Figure 17:
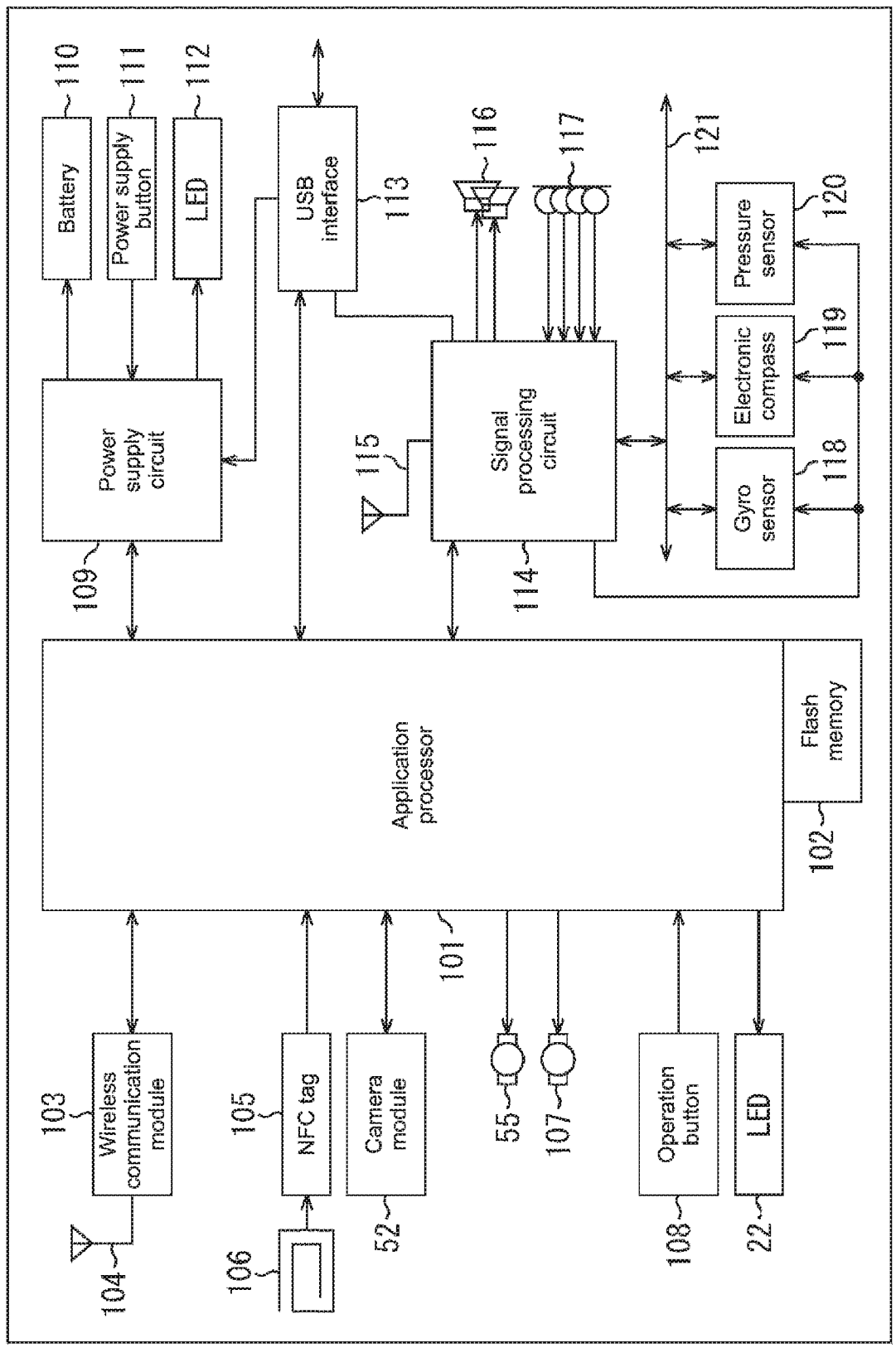
FIG. 17 is a block diagram showing an internal configuration example of the information processing terminal.

FIG. 17 is a block diagram showing an internal configuration example of the information processing terminal 1.

In FIG. 17, the structures that are the same as those described above are denoted by the same reference numerals, and overlapping descriptions will be omitted as appropriate.

An application processor 101 reads out programs stored in a flash memory 102 and the like and executes them to control overall operations of the information processing terminal 1.

Connected to the application processor 101 are a wireless communication module 103, an NFC tag 105, the camera module 52, the motor 55, a vibrator 107, an operation button 108, and the LED 22. A power supply circuit 109, a USB interface 113, and a signal processing circuit 114 are also connected to the application processor 101.

The wireless communication module 103 is a module that performs wireless communication conforming to a predetermined standard, such as Bluetooth (registered trademark) and Wi-Fi, with external apparatuses. For example, the wireless communication module 103 communicates with a mobile terminal possessed by the user, such as a smartphone, to transmit image data obtained by photographing and receive music data. A BT/Wi-Fi antenna 104 is connected to the wireless communication module 103. The wireless communication module 103 may also be capable of performing mobile telephone communication (3G, 4G, 5G, etc.), for example, via a WAN (Wide Area Network). Not all of Bluetooth, Wi-Fi, WAN, and NFC need to be mounted, and those may be mounted selectively. Modules that respectively perform communication using Bluetooth, Wi-Fi, WAN, and NFC may be provided as separate modules or may be provided as one module.

The NFC (Near Field Communication) tag 105 performs near field communication when an apparatus including an NFC tag comes close to the information processing terminal 1. An NFC antenna 106 is connected to the NFC tag 105.

The vibrator 107 is vibrated under control of the application processor 101 and notifies the user of an incoming call, mail reception, and the like. Information indicating an incoming call is transmitted from a mobile terminal of the user.

The operation button 108 includes various buttons provided on a casing of the information processing terminal 1. Signals representing contents of operations made to the operation button 108 are supplied to the application processor 101.

Connected to the power supply circuit 109 are a battery 110, a power supply button 111, an LED 112, and the USB interface 113. When the power supply button 111 is operated, the power supply circuit 109 activates the information processing terminal 1 and supplies a current from the battery 110 to the respective units. The power supply circuit 109 also supplies a current supplied via the USB interface 113 to the battery 110 and charges it.

The USB interface 113 communicates with an external apparatus via a USB cable connected to a USB terminal. The USB interface 113 also supplies a current supplied via the USB cable to the power supply circuit 109.

The signal processing circuit 114 processes signals from the various sensors and signals supplied from the application processor 101. A speaker 116 and a microphone 117 are connected to the signal processing circuit 114. Also connected to the signal processing circuit 114 via a bus 121 are a gyro sensor 118, an electronic compass 119, and a pressure sensor 120.

For example, the signal processing circuit 114 performs positioning on the basis of signals supplied from a GPS antenna 115 and outputs position information to the application processor 101. In other words, the signal processing circuit 114 functions as a GPS sensor.

The signal processing circuit 114 also acquires sensor data indicating detection results obtained by the sensors and outputs the sensor data to the application processor 101. From the signal processing circuit 114, the sensor data indicating the detection results obtained by the plurality of sensors is supplied via the bus 121. On the basis of the data supplied from the application processor 101, the signal processing circuit 114 causes music, audio, sound effects, and the like to be output from the speaker 116.

The microphone 117 detects user audio and outputs it to the signal processing circuit 114. As described above, the information processing terminal 1 can also be operated by audio.

The gyro sensor 118, the electronic compass 119, and the pressure sensor 120 respectively detect an angular velocity, direction, and pressure and output signals indicating the detection results to the signal processing circuit 114 via the bus 121.

In the example shown in FIG. 17, the camera module 52, the microphone 117, the gyro sensor 118, the electronic compass 119, the pressure sensor 120, and a GPS sensor (signal processing circuit 114) are provided as the sensors that detect an external environment and situation of the information processing terminal 1 itself. However, other sensors may also be provided. For example, an acceleration sensor, a pneumatic sensor, a proximity sensor, a biological sensor, an electric skin microphone, a geomagnetic sensor, and an inertial sensor may be provided. The inertial sensor includes a vibration sensor, an acceleration sensor, and a gyro sensor.

Figure 18:
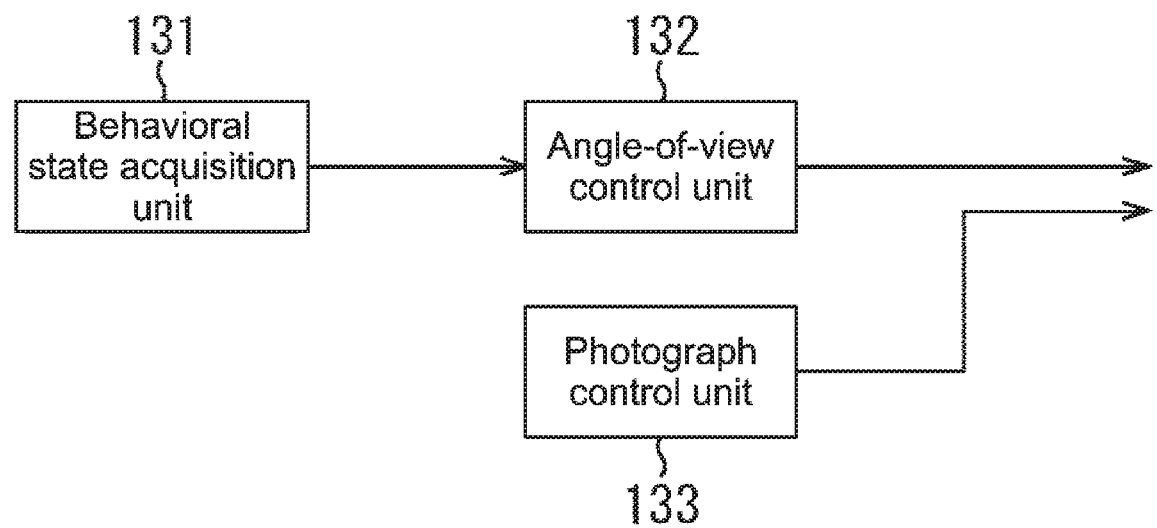
FIG. 18 is a block diagram showing a functional configuration example of the information processing terminal.

FIG. 18 is a block diagram showing a functional configuration example of the information processing terminal 1.

At least a part of the functional units shown in FIG. 18 is realized by the application processor 101 shown in FIG. 17 executing predetermined programs.

In the information processing terminal 1, a behavioral state acquisition unit 131, an angle-of-view control unit 132, and a photograph control unit 133 are realized.

The behavioral state acquisition unit 131 acquires a behavioral state of the user on the basis of sensor data supplied from the signal processing circuit 114. For example, the behavioral state acquisition unit 131 includes recognition information in which behavioral states are associated with the sensor data respectively detected at the time the user is taking those behaviors.

When acquiring the behavioral state, the behavioral state acquisition unit 131 references the recognition information and acquires a behavioral state associated with the sensor data as the behavioral state of the user. The behavioral state acquisition unit 131 outputs information indicating the acquired behavioral state to the angle-of-view control unit 132.

The angle-of-view control unit 132 adjusts the angle of the camera module 52 according to the behavioral state acquired by the behavioral state acquisition unit 131 and controls an angle of view of an image to be acquired. The angle-of-view control unit 132 includes control information in which the behavioral states are associated with the angles of the camera module 52.

After the angle of the camera module 52 is adjusted, the photograph control unit 133 controls the camera module 52 to perform photographing in the various photographing modes described above. The photograph control unit 133 outputs the photographed image to the flash memory 102 so that the image is stored in the flash memory 102.

FIG. 19 is a diagram showing an example of the control information in which the behavioral states are associated with angles of view. Information indicating the contents shown in FIG. 19 is managed by the angle-of-view control unit 132 as the control information.

In the example shown in FIG. 19, behavioral states of "walking", "running", "crouching", "sitting on chair", "walking up/down stairs", "walking uphill/downhill", "swimming", "riding bicycle", "riding on automobile", and "riding on train" are shown. As described above, states where the user is riding on various vehicles other than "bicycle" may be acquired as the behavioral states.

For example, when "walking" is acquired as the behavioral state, the angle-of-view control unit 132 adjusts the angle of the camera module 52 so that it becomes 80 degrees above a gravity acceleration direction.

Although a reference of the angle is the gravity acceleration direction in the example shown in FIG. 19, various references such as a horizontal direction, a casing direction indicated by the dashed arrow #1 of FIG. 4, and an angle of the camera module 52 when closed can be used to express those angles.

Moreover, when "running" is acquired as the behavioral state, the angle-of-view control unit 132 adjusts the angle of the camera module 52 so that it becomes 90 degrees upward from the gravity acceleration direction.

When the lens 31 is a zoom lens, the angle of view may be narrowed by not only adjusting the angle but also elongating the focal distance of the lens 31. Instead of optically narrowing the angle of view, the angle of view may be narrowed electronically by cutting out a partial range of a photographed image by trimming. The electronic control of the angle of view will be described later.

The angle of the camera module 52 may also be adjusted according to velocities instead of adjusting it based merely on the behavioral states of "walking" and "running".

When "crouching" is acquired as the behavioral state, the angle-of-view control unit 132 adjusts the angle of the camera module 52 so that it becomes 30 degrees upward from the gravity acceleration direction.

In this case, optical or electronic control for narrowing the angle of view is performed as appropriate. The crouching user is considered to be focusing on a close object below an eye level. By suppressing the angle of the camera module 52, photographing in which the object that the user is focusing on is set within the angle of view becomes possible.

When "sitting on chair" is acquired as the behavioral state, the angle-of-view control unit 132 adjusts the angle of the camera module 52 so that it becomes 45 degrees upward from the gravity acceleration direction. Further, optical or electronic control for narrowing the angle of view is performed as appropriate.

When "walking up/down stairs" is acquired as the behavioral state, the angle-of-view control unit 132 closes the lens cover 51 and accommodates the lens 31 so that photographing cannot be performed. For example, by prohibiting photographing when walking up/down the stairs, it becomes possible to prevent the information processing terminal 1 from being used for the purpose of camera voyeurism.

When walking up the stairs is acquired as the behavioral state, the angle-of-view control unit 132 adjusts the angle of the camera module 52 so that it becomes 120 degrees upward from the gravity acceleration direction. Prohibiting photographing or adjusting the angle so that it becomes 120 degrees upward from the gravity acceleration direction may be selected as appropriate. Moreover, when walking down the stairs is acquired as the behavioral state, the angle-of-view control unit 132 adjusts the angle of the camera module 52 so that it becomes 60 degrees upward from the gravity acceleration direction.

When walking uphill is acquired, control similar to that performed when walking up the stairs is performed. Further, when walking downhill is acquired, control similar to that performed when walking down the stairs is performed.

When a state of swimming at a low velocity is acquired as the behavioral state, the angle-of-view control unit 132 adjusts the angle of the camera module 52 so that it becomes 30 degrees upward from the gravity acceleration direction. The information processing terminal 1 has waterproof performance.

Further, when a state of swimming at a high velocity is acquired as the behavioral state, the angle-of-view control unit 132 adjusts the angle of the camera module 52 so that it becomes 90 degrees upward from the gravity acceleration direction.

When a state of riding a bicycle at a low velocity is acquired as the behavioral state, the angle-of-view control unit 132 adjusts the angle of the camera module 52 so that it becomes 50 degrees upward from the gravity acceleration direction.

When a state of riding a bicycle at a high velocity is acquired as the behavioral state, the angle-of-view control unit 132 adjusts the angle of the camera module 52 so that it becomes 55 degrees upward from the gravity acceleration direction.

When a state of driving a vehicle is acquired as the behavioral state, the angle-of-view control unit 132 adjusts the angle of the camera module 52 so that it becomes 85 degrees upward from the gravity acceleration direction. Further, optical or electronic control for narrowing the angle of view as compared to that in the walking state is performed as appropriate.

The angle of view may be varied in the horizontal direction in link with a direction of the user's head. Varying the angle of view in the horizontal direction is performed optically in a case where the angle of the camera module 52 can be varied in not only the longitudinal direction but also the horizontal direction. When the angle cannot be varied in the horizontal direction, varying the angle of view in the horizontal direction is performed electronically.

When a state of riding on a train is acquired as the behavioral state, the angle-of-view control unit 132 adjusts the angle of the camera module 52 so that it becomes 85 degrees upward from the gravity acceleration direction and 50 degrees in the right- or left-hand direction using a predetermined direction such as a traveling direction as a reference. When a state of riding on an automobile but not driving is acquired as the behavioral state, similar control is performed.

On the basis of the control information as described above, the angle-of-view control unit 132 performs the angle adjustment of the camera module 52, and the like. It should be noted that the angles shown in FIG. 19 can be changed arbitrarily. As in the case where the lens 31 is accommodated to prohibit photographing when "swimming" is acquired, correspondence relationships among the behavioral states and the control contents can be changed arbitrarily. Further, the angle may be adjusted on the basis of not only the behavioral state but also other environmental information such as a posture, wearing position, and movement velocity of the information processing terminal 1. The movement velocity may be a movement velocity expressed by a numerical value. The combination of information to be used for the angle adjustment is arbitrary.

<4-2. Operation of Information Processing Terminal>

Figure 20:
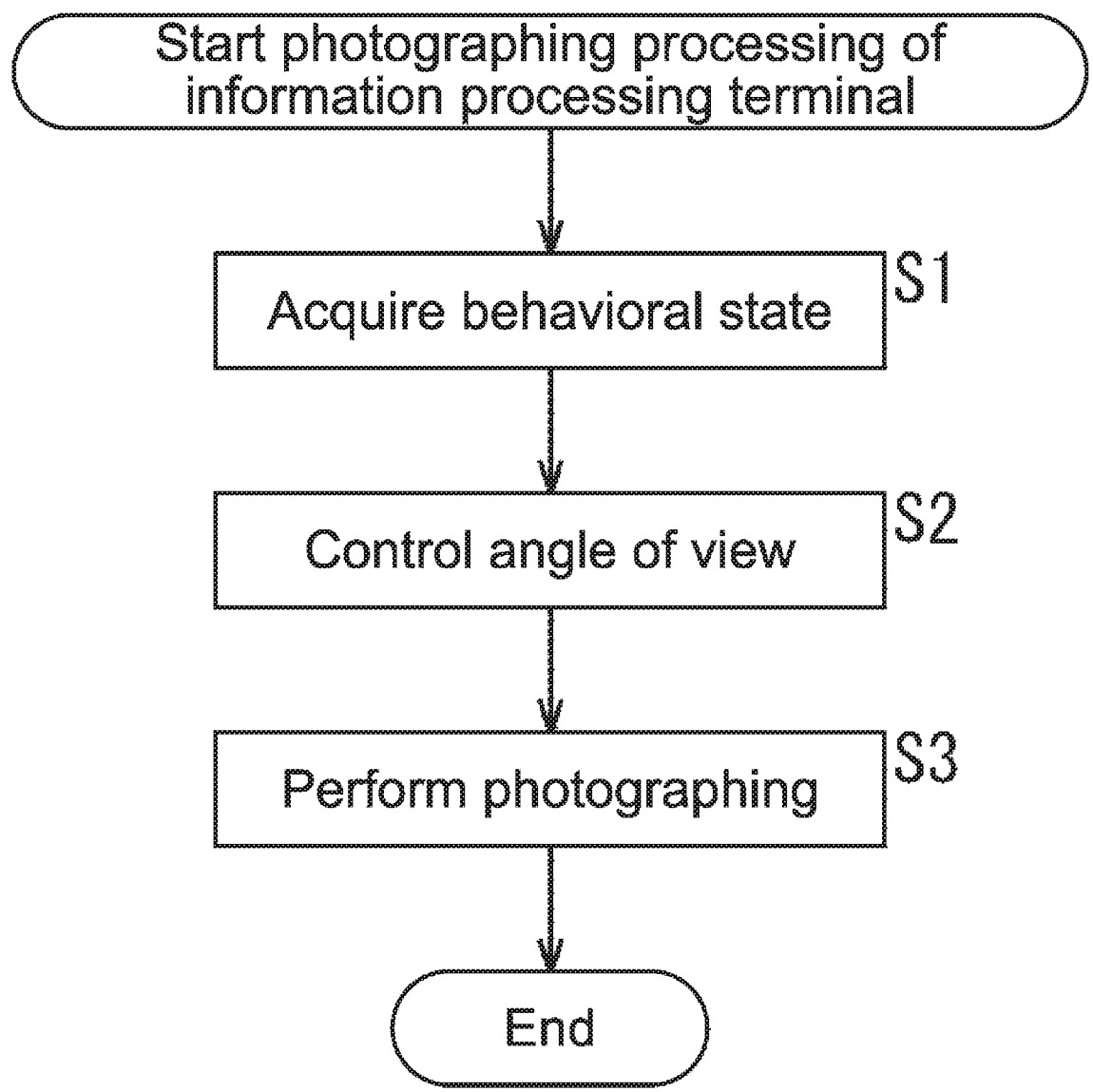
FIG. 20 is a flowchart for explaining photographing processing carried out by the information processing terminal.

Next, photographing processing of the information processing terminal 1 will be described with reference to the flowchart of FIG. 20. The processing shown in FIG. 20 is started when an audio command is detected on the basis of user utterances, for example.

In Step S1, the behavioral state acquisition unit 131 acquires a behavioral state of the user on the basis of sensor data supplied from the signal processing circuit 114. Here, the various behavioral states as those described with reference to FIG. 19 are acquired.

In Step S2, the angle-of-view control unit 132 adjusts the angle of the camera module 52 according to the behavioral state acquired by the behavioral state acquisition unit 131 and controls an angle of view of an image to be acquired.

In Step S3, after the angle of the camera module 52 is adjusted, the photograph control unit 133 controls the camera module 52 to perform photographing according to the photographing mode. The photograph control unit 133 stores the photographed image in the flash memory 102 and ends the processing.

As described above, since the control contents of the camera module 52 are determined with respect to the plurality of types of behavioral states, the information processing terminal 1 can obtain images having optimal angles of view respectively corresponding to the behavioral states.

In photographing in the still image photographing mode, for example, the behavioral state of the user is acquired and the angle of the camera module 52 is adjusted every time photographing is performed. Therefore, even when the casing posture or the behavioral state of the user is changed, the information processing terminal 1 can constantly photograph an image having an optimal angle of view following those changes. It is also possible to periodically acquire the behavioral state of the user while photographing is performed once in the interval photographing mode or the moving image shooting mode and adjust the angle of the camera module 52 every time the behavioral state is acquired.

Further, the user can operate the information processing terminal 1 by audio without touching the information processing terminal 1. Specifically, when there is a need to operate a button during photographing, the behavior may need to be interrupted depending on the content of the operation, but comfortable and natural photographing that does not require such interruption and can be performed immediately becomes possible. Suppressing the number of buttons is advantageous in terms of securing an intensity of the casing of the information processing terminal 1 and securing the waterproof performance.

5. Modified Example

5-1. Example of Control System

All of the processes of the acquisition of the behavioral state, determination of the adjustment angle, and the angle adjustment are carried out by the information processing terminal 1, but the acquisition of the behavioral state and the adjustment angle determination can be carried out in other apparatuses.

Figure 21:
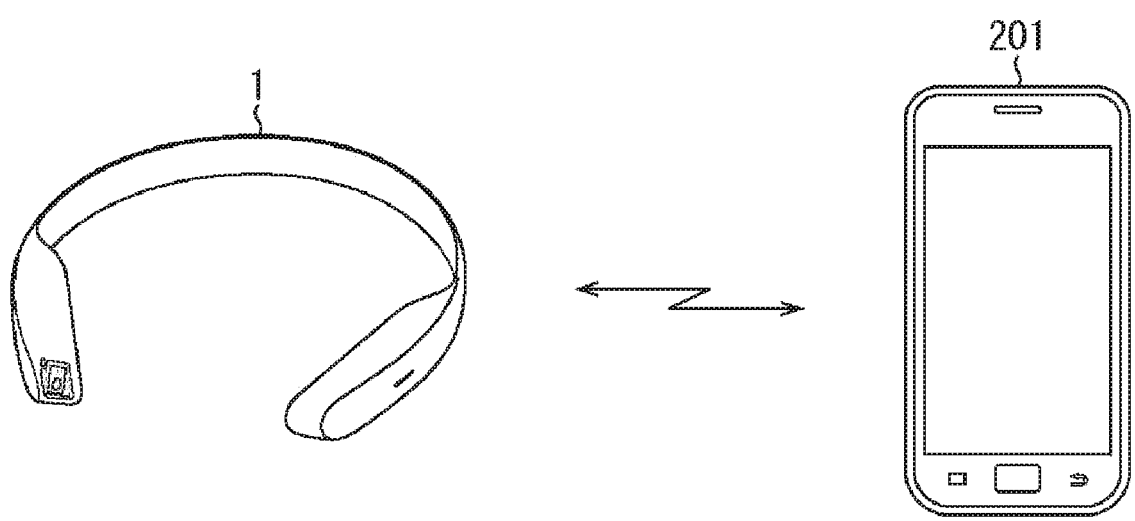
FIG. 21 is a diagram showing an example of a control system.

FIG. 21 is a diagram showing an example of a control system.

The control system shown in FIG. 21 is constituted of the information processing terminal 1 and a mobile terminal 201. The mobile terminal 201 is a terminal such as a smartphone that is carried by the user wearing the information processing terminal 1. The information processing terminal 1 and the mobile terminal 201 are mutually connected via wireless communication such as Bluetooth and Wi-Fi.

The information processing terminal 1 transmits sensor data indicating the detection results of the sensors to the mobile terminal 201 during photographing. The mobile terminal 201 that has received the sensor data transmitted from the information processing terminal 1 specifies the behavioral state of the user on the basis of the sensor data and transmits information indicating the behavioral state to the information processing terminal 1.

The information processing terminal 1 receives the information transmitted from the mobile terminal 201 and acquires the behavioral state of the user specified by the mobile terminal 201. The information processing terminal 1 determines the adjustment angle corresponding to the acquired behavioral state and adjusts the angle of the camera module 52 to perform photographing.

In this case, a configuration including a function similar to that of the behavioral state acquisition unit 131 shown in FIG. 18 is realized in the mobile terminal 201. Further, the angle-of-view control unit 132 and the photograph control unit 133 shown in FIG. 18 are realized in the information processing terminal 1.

As described above, at least a part of the processing may be carried out by another apparatus different from the information processing terminal 1. Not only the behavioral state acquisition but also the processing up to determining the adjustment angle of the camera module 52 corresponding to the behavioral state may be carried out by the mobile terminal 201.

Figure 22:
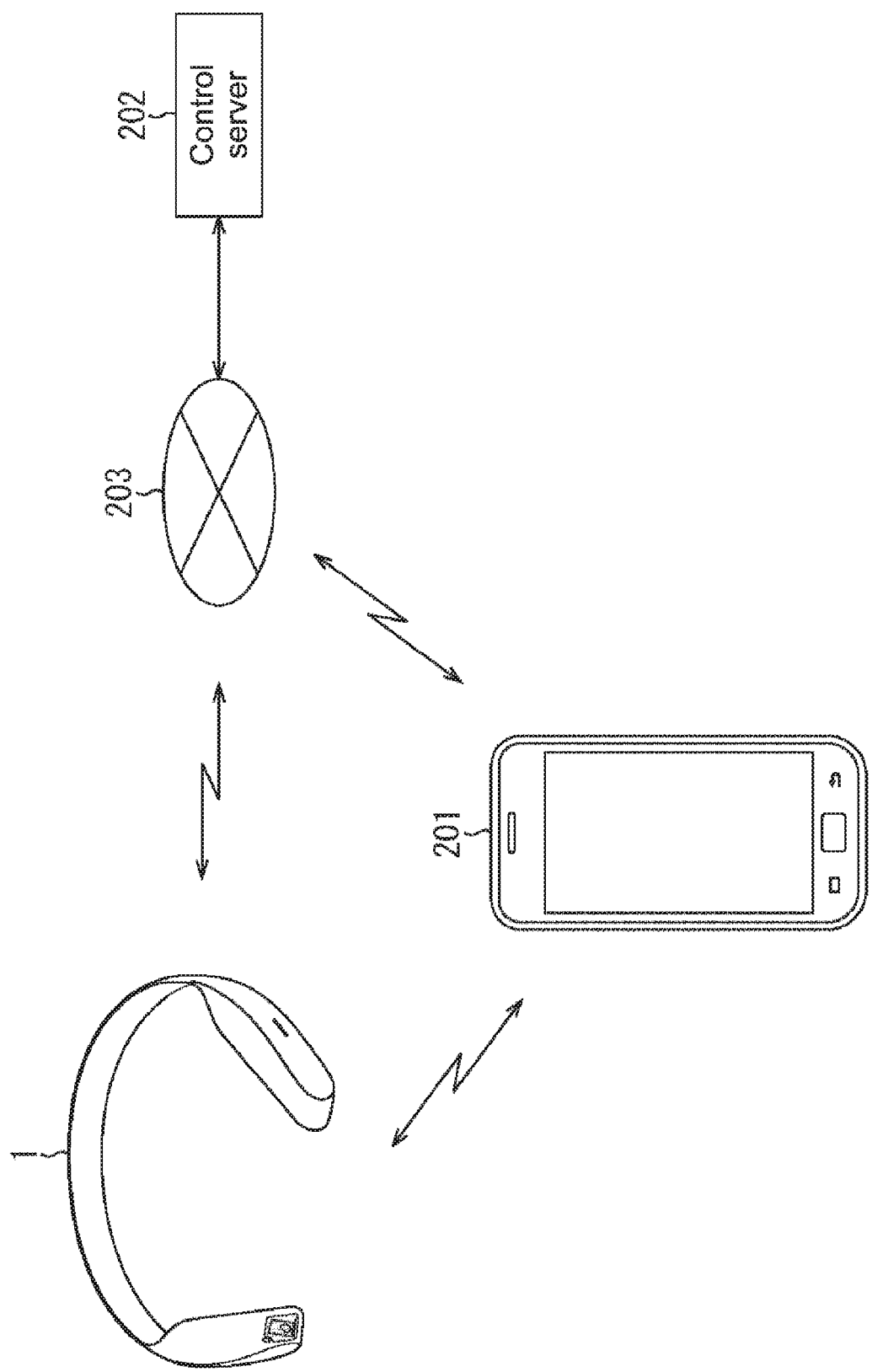
FIG. 22 is a diagram showing another example of the control system.

FIG. 22 is a diagram showing another example of the control system.

The control system shown in FIG. 22 is constituted of the information processing terminal 1, the mobile terminal 201, and a control server 202. The mobile terminal 201 and the control server 202 are mutually connected via a network 203 such as the Internet.

When the mobile terminal 201 includes a so-called tethering function, the information processing terminal 1 may be connected to the network 203 via the mobile terminal 201. In this case, exchange of information between the information processing terminal 1 and the control server 202 is carried out via the mobile terminal 201 and the network 203.

Similar to the case described above with reference to FIG. 21, the information processing terminal 1 transmits sensor data indicating detection results of the sensors to the control server 202 during photographing. The control server 202 that has received the sensor data transmitted from the information processing terminal 1 specifies the behavioral state of the user on the basis of the sensor data and transmits information indicating the behavioral state to the information processing terminal 1.

The information processing terminal 1 receives the information transmitted from the control server 202 and acquires the behavioral state of the user specified by the control server 202. The information processing terminal 1 determines the adjustment angle corresponding to the acquired behavioral state and adjusts the angle of the camera module 52 to perform photographing.

In this case, a configuration including a function similar to that of the behavioral state acquisition unit 131 shown in FIG. 18 is realized in the control server 202. The angle-of-view control unit 132 and the photograph control unit 133 shown in FIG. 18 are realized in the information processing terminal 1.

As described above, at least a part of the processing may be carried out by an apparatus connected via the network 203. Not only the behavioral state acquisition but also the processing up to determining the adjustment angle of the camera module 52 corresponding to the behavioral state may be carried out by the control server 202.

5-2. Example of Electronically Controlling Angle of View

The case of optically controlling the angle of view has been mainly described, but the angle of view can also be controlled electronically by varying a cutout range in trimming. In this case, a lens having a short focal distance such as a fisheye lens is used as the lens 31.

Figure 23:
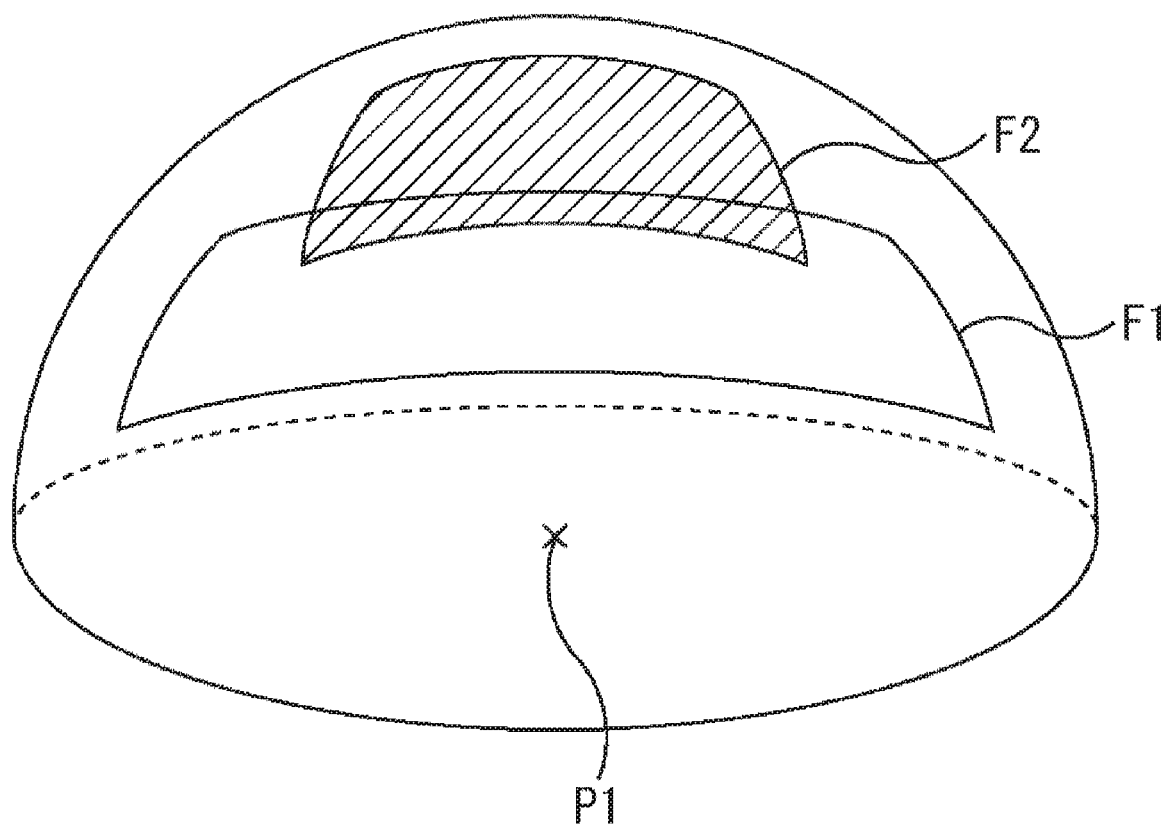
FIG. 23 is a diagram showing an example of electronic control of an angle of view.

FIG. 23 is a diagram showing an example of the electronic control of the angle of view.

The hemisphere shown in FIG. 23 shows an entire range to be captured by the lens 31. The position P indicates a position of the lens 31. It should be noted that FIG. 23 is used for explaining a general idea of changing the cutout range, and the frame size, curvature, and the like are inaccurate.

For example, when the user is walking, an image within a range indicated by the frame F1 out of the entire image indicated by the hemisphere that has been taken by the camera module 52, is cut out by trimming. The image within the range indicated by the frame F1 is acquired as an image having an angle of view corresponding to the behavioral state.

Further, when the user is running, an image within a range indicated by the frame F2 out of the entire image indicated by the hemisphere that has been taken by the camera module 52, is cut out by trimming. The image within the range indicated by the frame F2 is acquired as an image having an angle of view corresponding to the behavioral state.

The range of the frame F2 is set higher than the range of the frame F1. Accordingly, when the user is running, an image within the range higher than that when walking is acquired. As described above with reference to FIG. 19 and the like, when comparing the walking state and the running state, an image having a higher angle of view is acquired in the latter case.

Further, the range of the frame F2 is smaller than the range of the frame F1. By narrowing the range to be cut out by trimming, the angle of view can be controlled similar to the case of varying the focal distance of the zoom lens.

As described above, by electronically controlling the angle of view, a mechanism for adjusting the angle of the camera module 52 does not need to be provided, and thus the information processing terminal 1 can be miniaturized. The optical control of the angle of view and the electronic control of the angle of view can also be combined.

5-3. Specific Example of Behavioral State

The behavioral state has been acquired on the basis of sensor data. However, the behavioral state acquisition method can be changed arbitrarily.

Example that Uses Position Information

The behavioral state of the user may be acquired on the basis of position information detected by the signal processing circuit 114 as the GPS sensor. In this case, the behavioral state acquisition unit 131 manages information in which the position information and the behavioral states are associated with one another.

In the information managed by the behavioral state acquisition unit 131, for example, position information of a park is associated with running as the behavioral state. Moreover, position information of one's home is associated with sitting, and position information of streets between one's home and a nearest station is associated with walking.

The behavioral state acquisition unit 131 acquires a behavioral state managed in association with a current position measured at the time of photographing, as the current behavioral state of the user. Accordingly, the information processing terminal 1 can acquire the behavioral state of the user by measuring the current position.

Example that Uses Connection Destination Information

The behavioral state of the user may be specified on the basis of a connection destination apparatus in wireless communication. In this case, the behavioral state acquisition unit 131 manages information in which pieces of identification information of connection destination apparatuses are associated with behavioral states.

In the information managed by the behavioral state acquisition unit 131, for example, identification information of an access point set in a park is associated with running as the behavioral state. Moreover, identification information of an access point set in one's home is associated with sitting, and identification information of an access point set between one's home and a nearest station is associated with walking.

The wireless communication module 103 periodically searches for an apparatus to be a connection destination for wireless communication such as Wi-Fi. The behavioral state acquisition unit 131 acquires a behavioral state managed in association with an apparatus that is the connection destination at the time of photographing, as the current behavioral state of the user. Accordingly, the information processing terminal 1 can acquire the behavioral state of the user by searching for a connection destination apparatus.

Example that Uses Information of Proximal Apparatus

As described above, the information processing terminal 1 has the built-in NFC tag 105 and is capable of performing near-field communication with a proximal apparatus. The behavioral state of the user may be acquired on the basis of an apparatus that is in the proximity before photographing is performed. In this case, the behavioral state acquisition unit 131 manages information in which pieces of identification information of proximal apparatuses are associated with behavioral states.

In the information managed by the behavioral state acquisition unit 131, for example, identification information of an NFC tag incorporated into a bicycle is associated with riding a bicycle as the behavioral state. Further, identification information of an NFC tag incorporated into a chair at one's home is associated with sitting, and identification information of an NFC tag incorporated into running shoes is associated with running.

For example, before riding a bicycle while wearing the information processing terminal 1, the user brings the information processing terminal 1 close to the NFC tag incorporated into the bicycle. Upon detecting that the information processing terminal 1 has been brought close to the NFC tag of the bicycle, the behavioral state acquisition unit 131 acquires the behavioral state of the user assuming that the user is riding the bicycle after that.

As described above, various methods can be used as the method of acquiring a behavioral state.

5-4. Example of Terminal Shape

Example of Wearing Position

The information processing terminal 1 has been assumed to be a wearable terminal of a type that is hung from a neck. However, the function of controlling an angle of view described above is also applicable to camera-equipped wearable terminals having other shapes.

Figure 24:
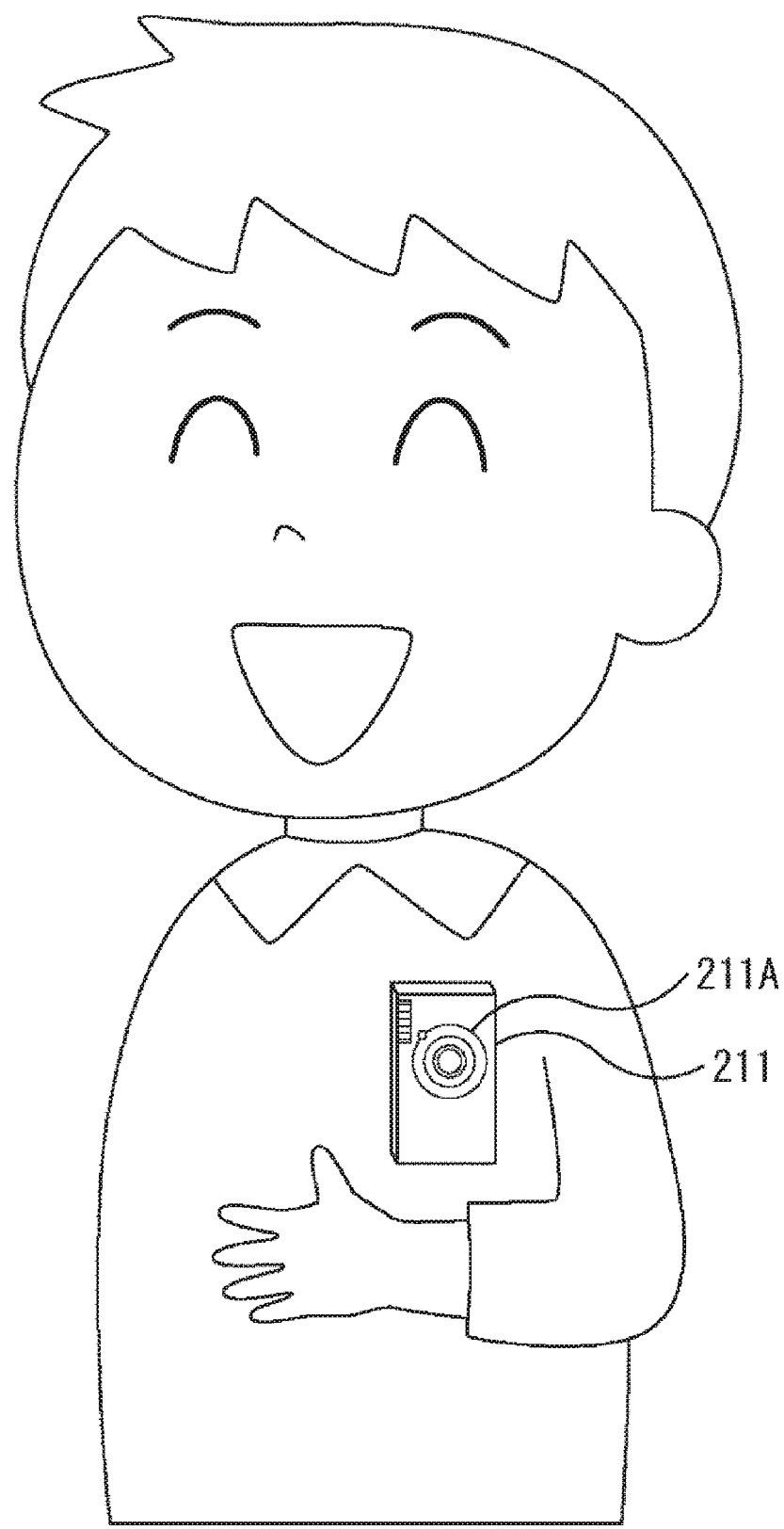
FIG. 24 is a diagram showing a shape example of the information processing terminal.

FIG. 24 is a diagram showing an example of the information processing terminal having another shape.

A mobile terminal 211 shown in FIG. 24 is a wearable terminal that can be worn at an arbitrary position of the user's body using a clip provided on a back surface of a casing or the like. In the example shown in FIG. 24, the mobile terminal 211 is attached to a position near the chest of the user. A camera 221A is provided on a front surface of the casing of the mobile terminal 211.

The mobile terminal 211 may be worn at other positions such as a wrist and an ankle. The function of controlling an angle of view described above is also applicable to terminals worn at parts lower than a head where a posture of the terminal is determined based mainly on the posture of the upper body of the user, such as a shoulder and a waist. In this case, the content of control of the angle of view may be varied depending on the attached position.

Further, the information processing terminal 1 and the mobile terminal 211 may be used while being attached to a mount attached to a dashboard of an automobile or a mount attached to a handle of a bicycle. In this case, the information processing terminal 1 and the mobile terminal 211 are used as a so-called drive recorder or an obstacle sensor.

Example when Applied to Camera Platform

The function of controlling an angle of view described above may be applied to a camera platform that controls an angle of view of a camera.

Figure 25:
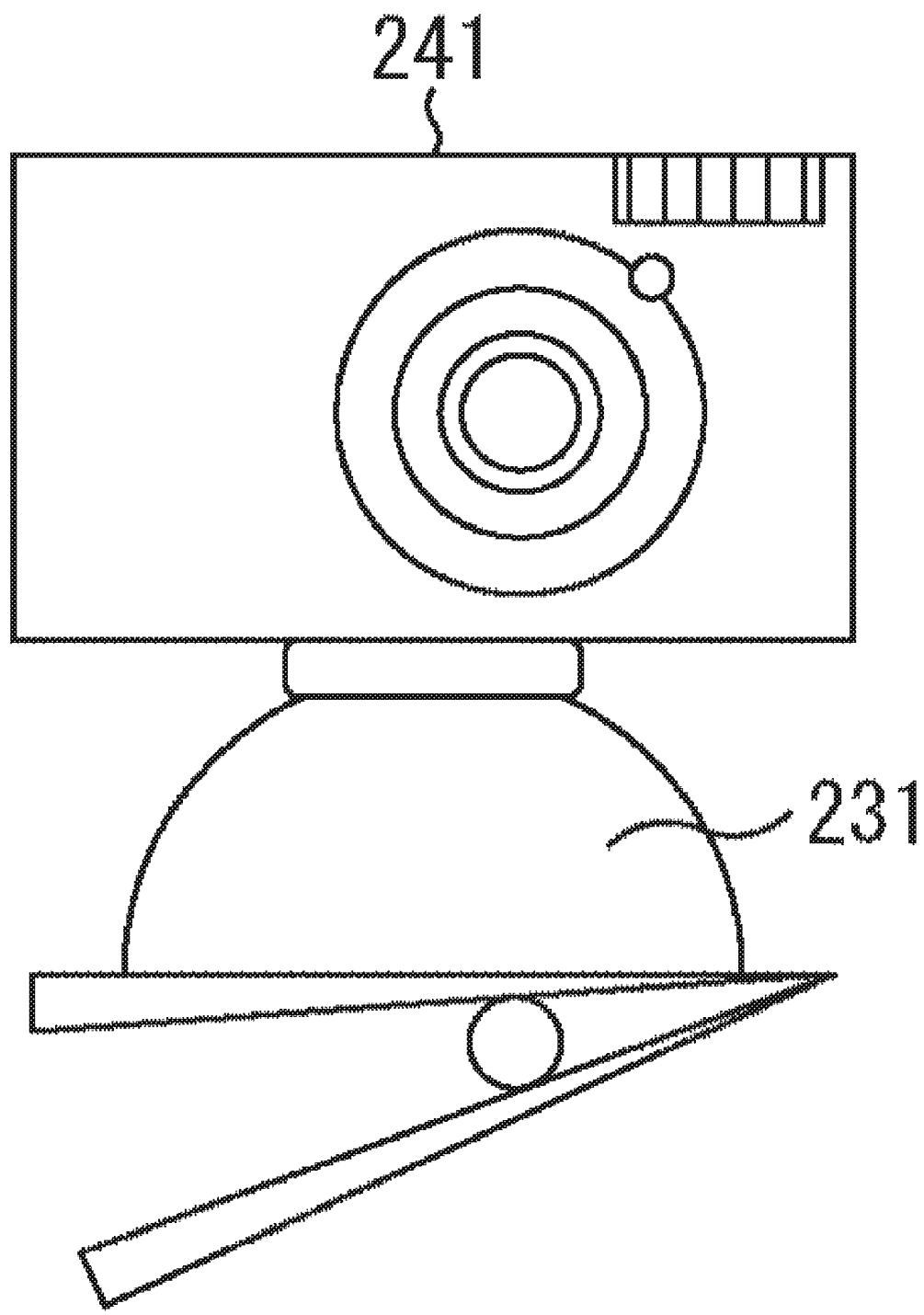
FIG. 25 is a diagram showing an example of a camera platform.

FIG. 25 is a diagram showing an example of the camera platform as the information processing terminal.

The camera platform 231 is a camera platform capable of being attached to a body of a user using a clip or the like. The user attaches the camera platform 231 on which a camera 241 is mounted at predetermined positions such as a chest, shoulder, wrist, and ankle. The camera platform 231 and the camera 241 are capable of communicating with each other wirelessly or via wires.

The camera platform 231 has a built-in application processor in addition to sensors that detect sensor data used for acquiring behavioral states. The application processor of the camera platform 231 executes predetermined programs to realize the functions described with reference to FIG. 18.

Specifically, the camera platform 231 acquires the behavioral state of the user on the basis of sensor data at the time of photographing and adjusts an angle of the camera 241 according to the acquired behavioral state. By causing photographing to be performed after the angle adjustment, the camera platform 231 controls the angle of view of an image to be photographed by the camera 241.

As described above, the function of controlling an angle of view described above is also applicable to apparatuses not including a photographing function, such as a camera platform.

5-5. Other Examples

Parameters (angles) used for the angle adjustments respectively corresponding to the behavioral states may be fixed values set when designed or may be changed as appropriate according to differences in wearing positions, differences in physiques, differences in postures when riding bicycles, and the like.

The parameters may be changed automatically using a steady state such as a walking state as a reference or may be changed manually by the user, for example.

Further, although the camera block is provided in the right-hand side unit 12, it may instead be provided in the left-hand side unit 13 or may be provided in both of them. Moreover, the lens 31 may be provided while facing sideways instead of facing the front direction.

Although the camera cover 51 is closed when photographing is not performed, it is also possible to perform a person recognition using an image obtained by the photographing and close the camera cover 51 when a person is captured in a predetermined size or more. Accordingly, that person can be prevented from being photographed when approaching the user wearing the information processing terminal 1.

It is also possible to enable the angle of view of an image to be obtained by photographing to be adjusted by user audio.

Moreover, the direction of adjusting the angle of the camera module 52 may be a roll direction, a pitch direction, and a yaw direction.

As described above, the cover 21 fit into the opening 12A has a curved surface. Therefore, there is a possibility that resolution will be lowered or an object will be distorted at edges of an image photographed by the camera 52 as compared to the vicinity of the center.

Such a partial deterioration of an image may be prevented by carrying out image processing on the photographed image. The partial deterioration of an image may be optically prevented from occurring by varying properties of the cover 21 and the lens 31 according to positions. Furthermore, as in differentiating pixel pitches of an image pickup device in the camera module 52 between the vicinity of a center and vicinity of edges of the image pickup device, the property of the image pickup device itself may be changed.

The right-hand side unit 12 and the left-hand side unit 13 may be detachable from the band portion 11. The user selects the band portion 11 having a length corresponding to a length around his/her neck and attaches the right-hand side unit 12 and the left-hand side unit 13 to the band portion 11 to configure the information processing terminal 1.

6. Specific Configuration of Information Processing Terminal

Next, a specific configuration of the information processing terminal 1 will be described.

Figure 26:
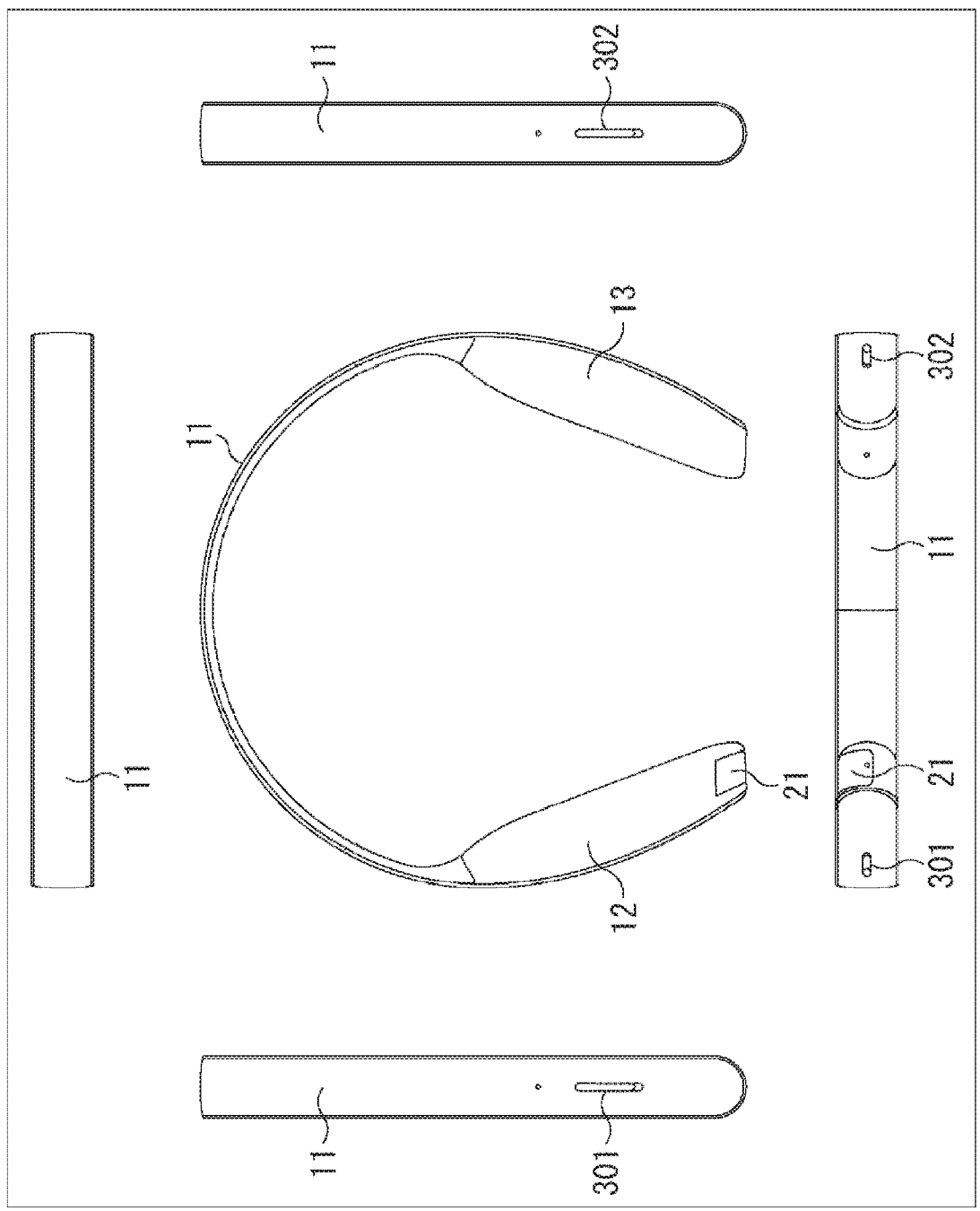
FIG. 26 is a diagram showing an appearance of the information processing terminal.
Figure 27:
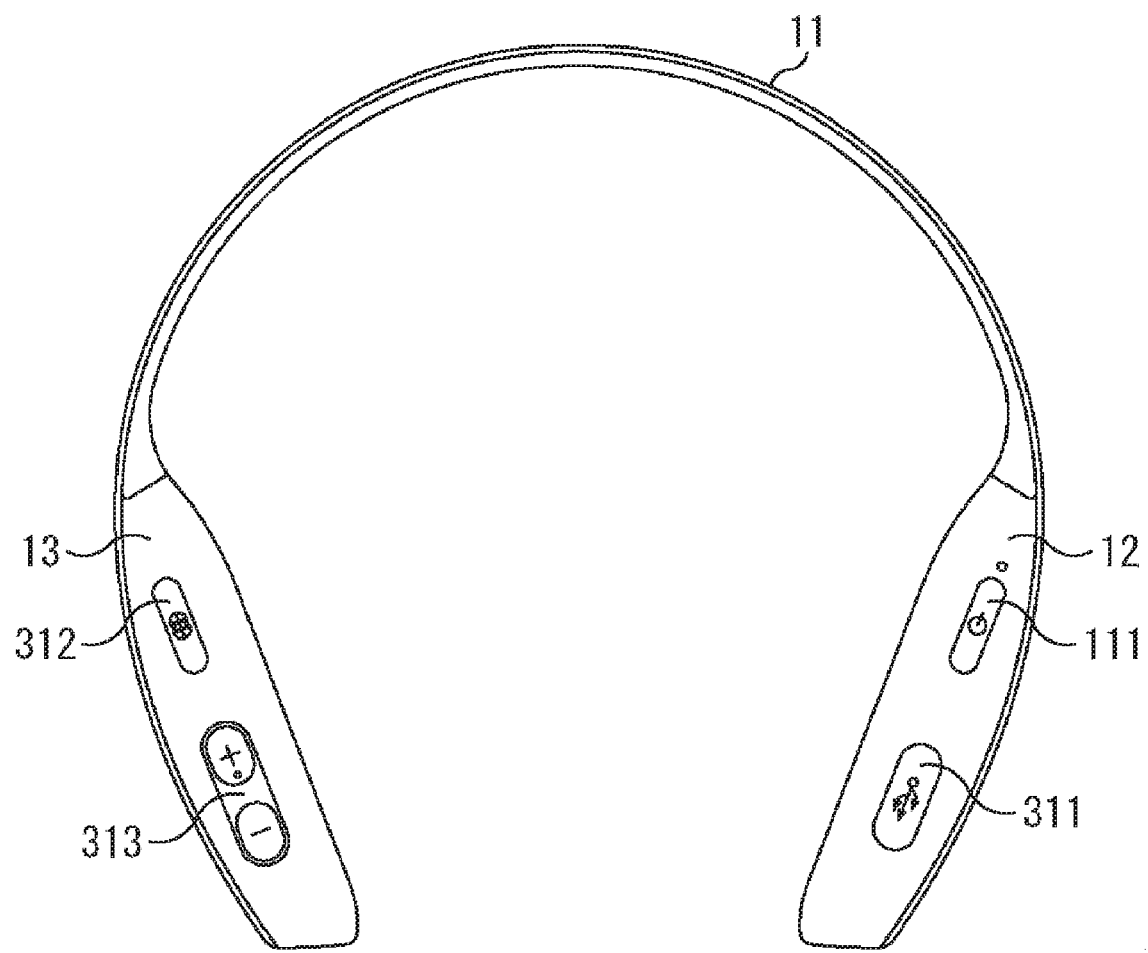
FIG. 27 is a diagram showing the appearance of the information processing terminal.

FIGS. 26 and 27 are each a diagram showing an appearance of the information processing terminal 1.

The front-view appearance of the information processing terminal 1 is shown at the center of FIG. 26. As shown in FIG. 26, a speaker hole 301 is formed on a left-hand side surface of the information processing terminal 1, and a speaker hole 302 is formed on a right-hand side surface.

As shown in FIG. 27, the power supply button 111 and a USB terminal 311 are provided on the back surface of the right-hand side unit 12. A cover formed of a resin, for example, covers the USB terminal 311.

On the back surface of the left-hand side unit 13, a custom button 312 that is operated when performing various settings and a volume button 313 that is operated when adjusting a volume are provided.

Figure 28:
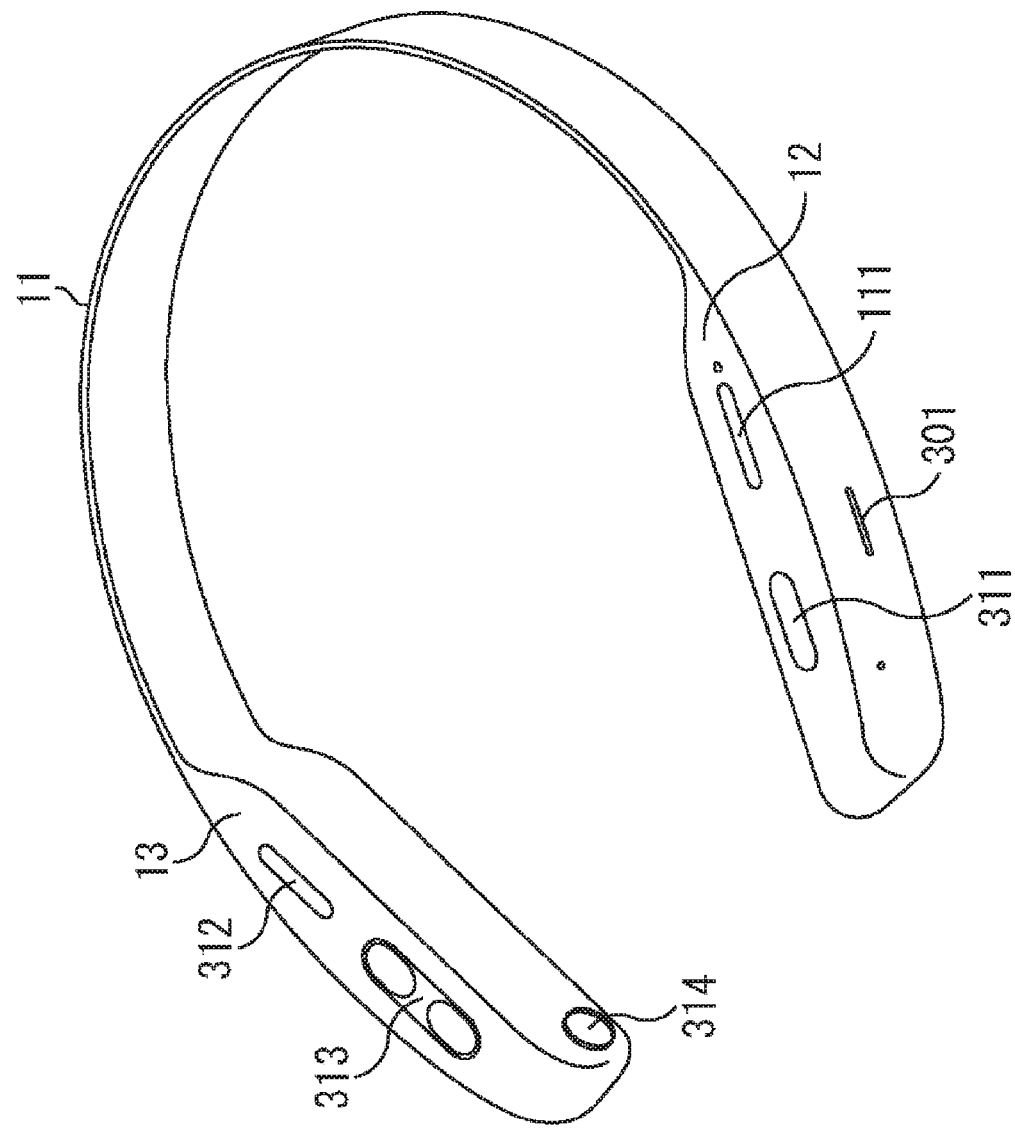
FIG. 28 is a perspective view of the appearance of the information processing terminal.

Further, near the tip end of the left-hand side unit 13 on the inner side thereof, an assist button 314 is provided as shown in FIG. 28. A predetermined function such as ending shooting of a moving image is allocated to the assist button 314. The custom button 312, the volume button 313, and the assist button 314 correspond to the operation button 108 shown in FIG. 17.

Figure 29:
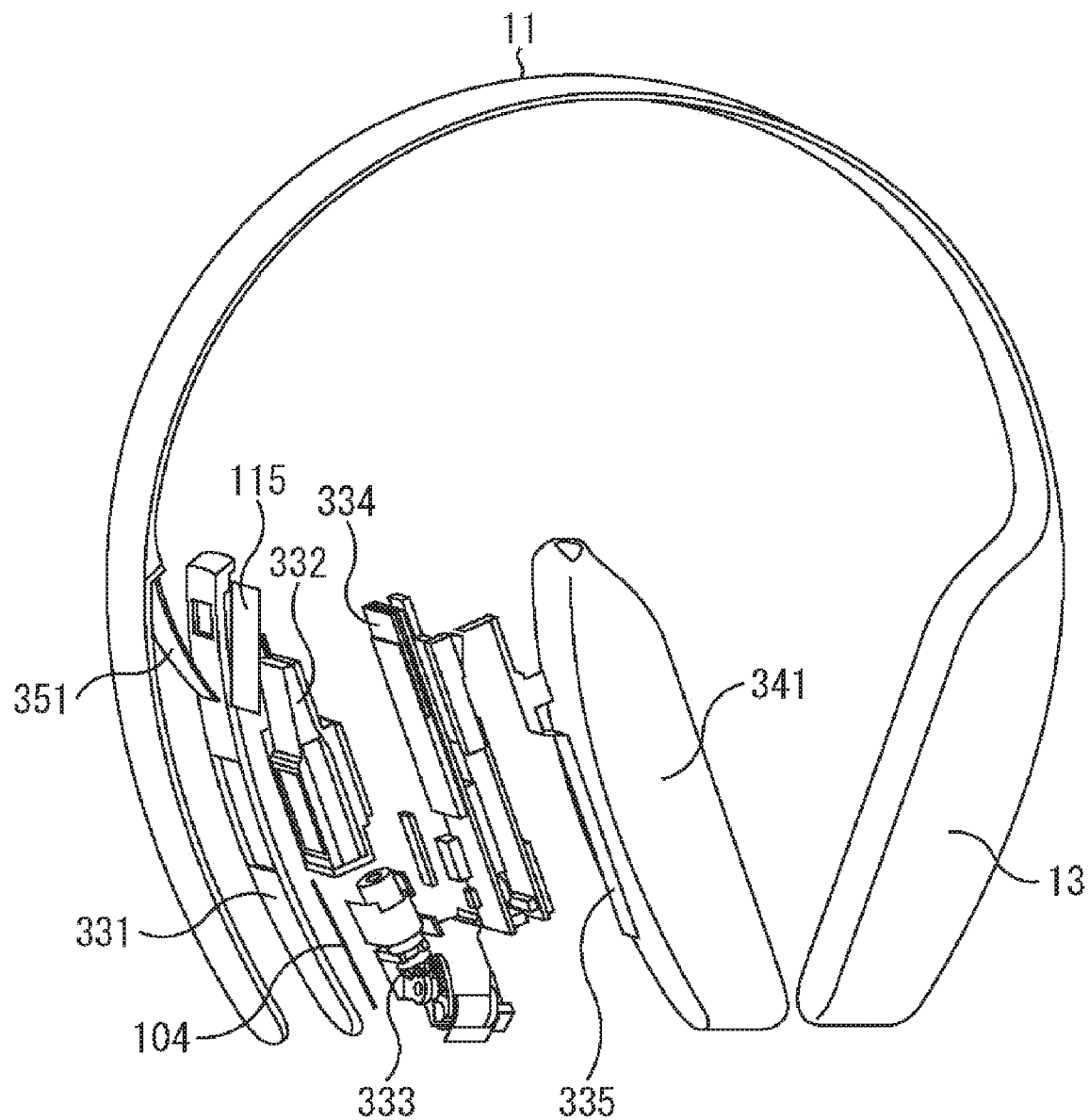
FIG. 29 is a diagram showing an internal configuration example of the right-hand side unit.

FIG. 29 is a diagram showing an internal configuration example of the right-hand side unit 12.

The right-hand side unit 12 is configured by laminating a base member 331, the GPS antenna 115, a speaker box 332, the BT/Wi-Fi antenna 104, a camera block 333, a substrate block 334, and a wiring 335 and covering them with an exterior case 341.

The speaker box 332 arranged while being in contact with the substrate block 334 is formed of aluminum for releasing heat of the substrate block 334. The BT/Wi-Fi antenna 104 and the GPS antenna 115 are arranged while being deviated from the speaker box 332.

Figure 30:
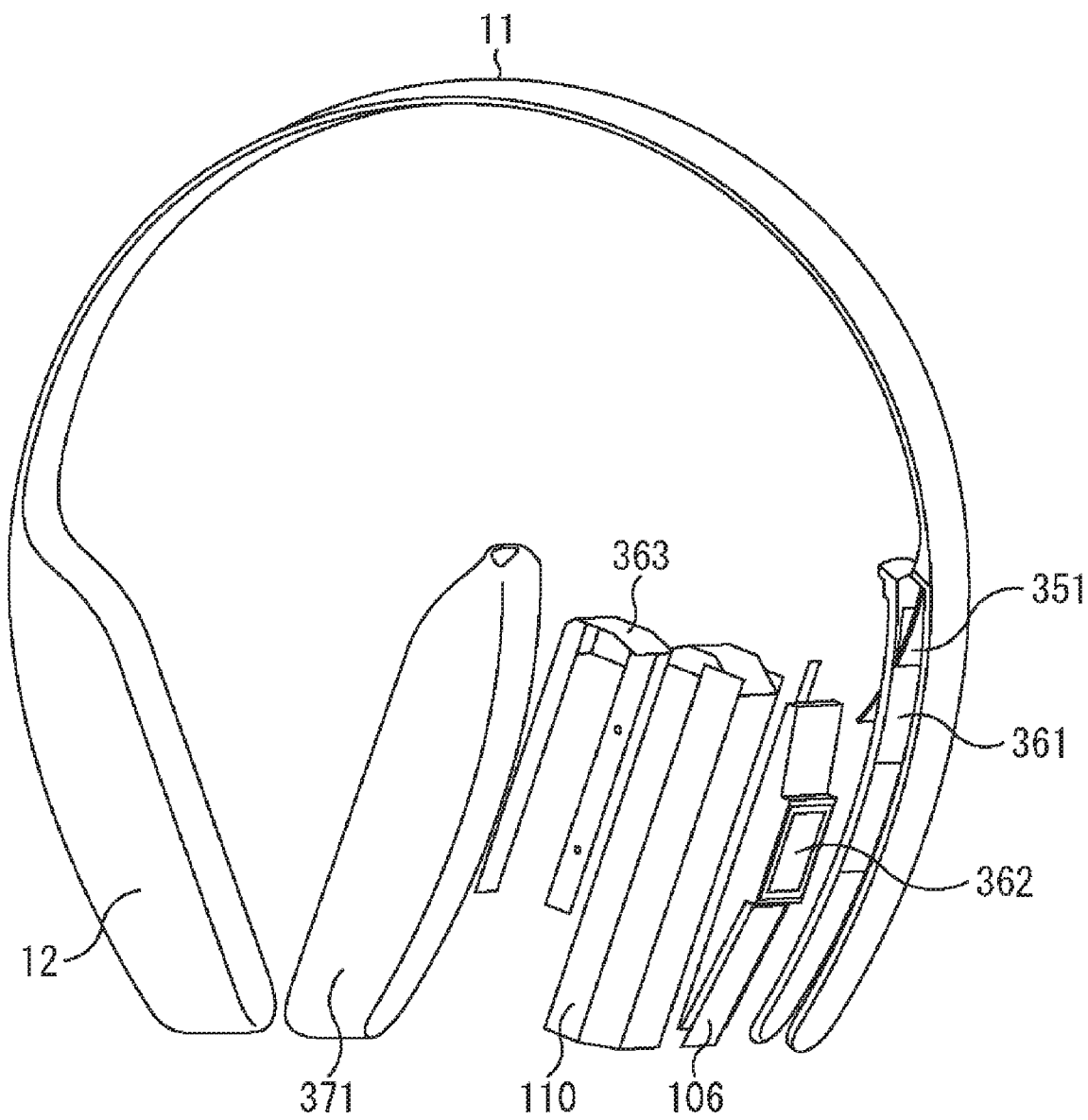
FIG. 30 is a diagram showing an internal configuration example of a left-hand side unit.

FIG. 30 is a diagram showing an internal configuration example of the left-hand side unit 13.

The left-hand side unit 13 is configured by laminating a base member 361, a speaker box 362, the NFC antenna 106, the battery 110, and a wiring 363 and covering them with an exterior case 371.

An intra-band flexible wiring 351 that connects the configuration inside the right-hand side unit 12 and the configuration inside the left-hand side unit 13 is passed through a hollow space formed inside the band portion 11. The band portion 11 has a tube configuration. The configuration inside the right-hand side unit 12 and the configuration inside the left-hand side unit 13 may be connected by a cable harness instead of the flexible wiring.

Figure 31:
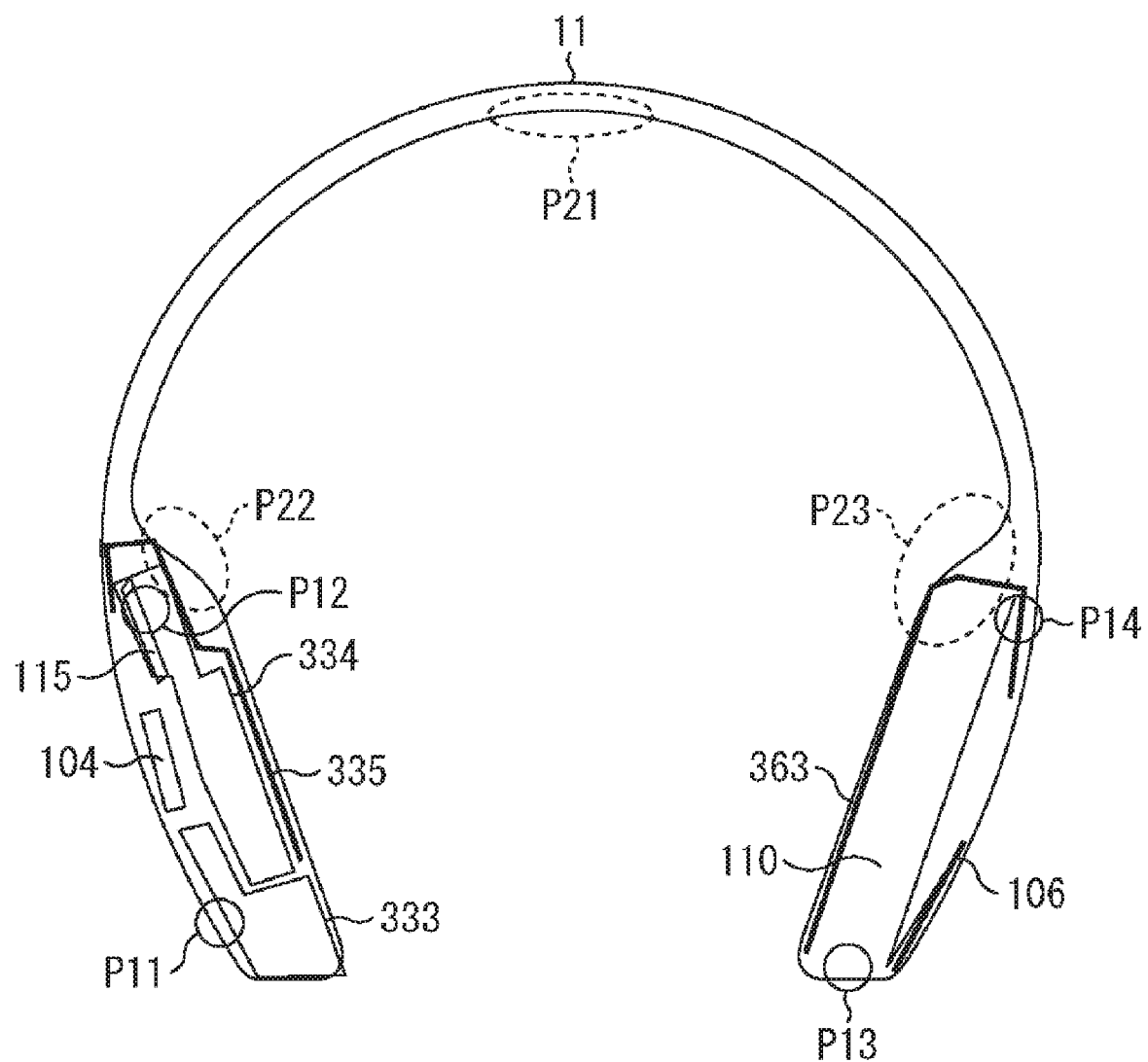
FIG. 31 is a diagram showing an arrangement example of the respective configurations.

FIG. 31 is a diagram showing an arrangement example of the respective configurations. For convenience in describing, detailed illustrations of the configurations are omitted in FIG. 31.

As shown in FIG. 31, in the right-hand side unit 12, the BT/Wi-Fi antenna 104 and the GPS antenna 115 are provided at positions closer to the side surface of the information processing terminal 1 than the speaker box 332. Further, the wiring 335 connecting the substrate block 334 and the like with the intra-band flexible wiring 351 is provided along an outer shape of the right-hand side unit 12 while avoiding the substrate block 334. In FIG. 31, the wiring 335 is indicated by a bold line.

On the other hand, in the left-hand side unit 13, a wiring 363 connecting the battery 110 and the like with the intra-band flexible wiring 351 is provided along an outer shape of the left-hand side unit 13 while avoiding the battery 110. In FIG. 31, the wiring 363 is indicated by a bold line.

It should be noted that 4 microphones 117 are provided, for example. The 4 microphones 117 are respectively provided at positions P11 to P14 each surrounded by a circle, for example.

As described above, a proximity sensor, a biological sensor, and an electric skin microphone can be mounted on the information processing terminal 1. In this case, the proximity sensor that detects an approach to a human body can be provided at a position P21 shown in FIG. 31, for example, on the band portion 11.

Further, the proximity sensor, the biological sensor, and the electric skin microphone can be provided at positions P22 and P23 near the front of the neck when worn. Since the positions P22 and P23 are positions near the bulged portions of the right-hand side unit 12 and the left-hand side unit 13 and positioned near the skin when worn, sensitivities of the sensors can be improved.

Figure 32:
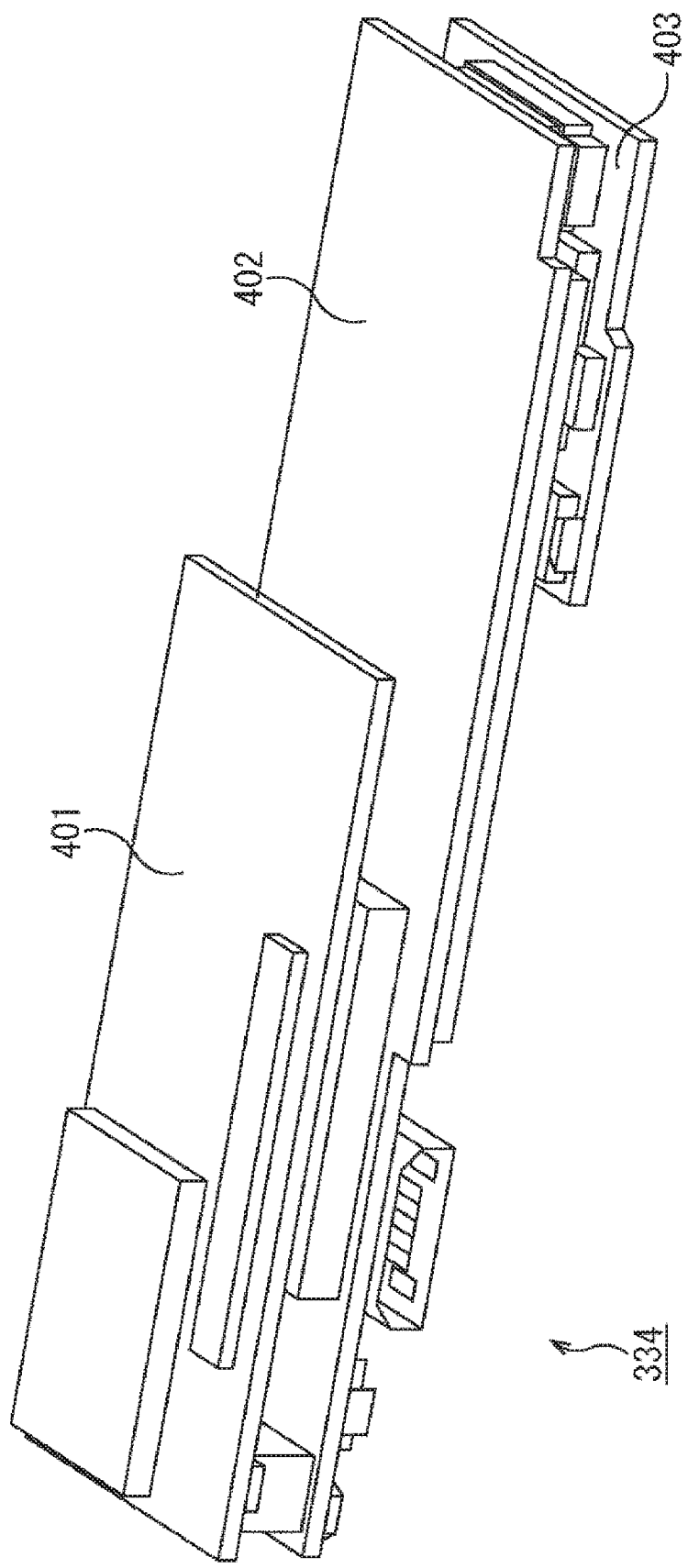
FIG. 32 is a diagram showing a substrate block.

FIG. 32 is a diagram showing the substrate block 334 accommodated in the right-hand side unit 12.

Figure 33:
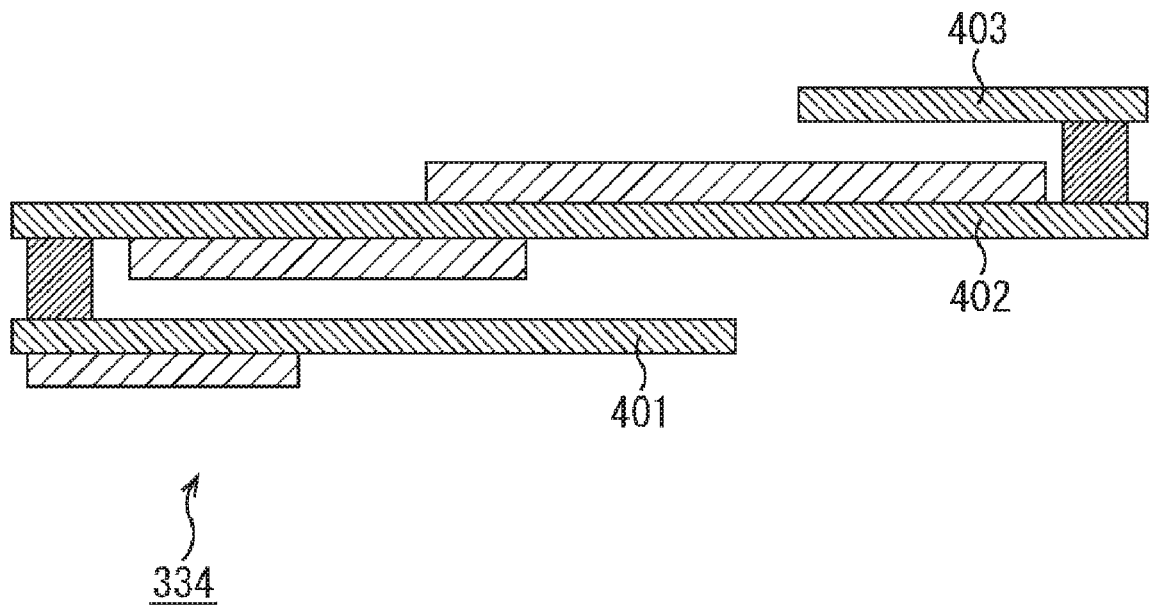
FIG. 33 is a diagram showing a substrate configuration of the substrate block.

The substrate block 334 has a 3-layer configuration including a substrate 401, a substrate 402, and a substrate 403. The substrates are electrically connected to one another as shown in FIG. 33.

The substrate 401 is a substrate in which an IC chip of the signal processing circuit 114 is provided, and a length thereof is substantially ⅔ the length of the substrate 402. The substrate 402 is a substrate in which the application processor 101 is provided. The substrate 403 as the lower layer is a substrate in which the wireless communication module 103 is provided, and a length thereof is substantially ⅓ the length of the substrate 402.

Figure 34:
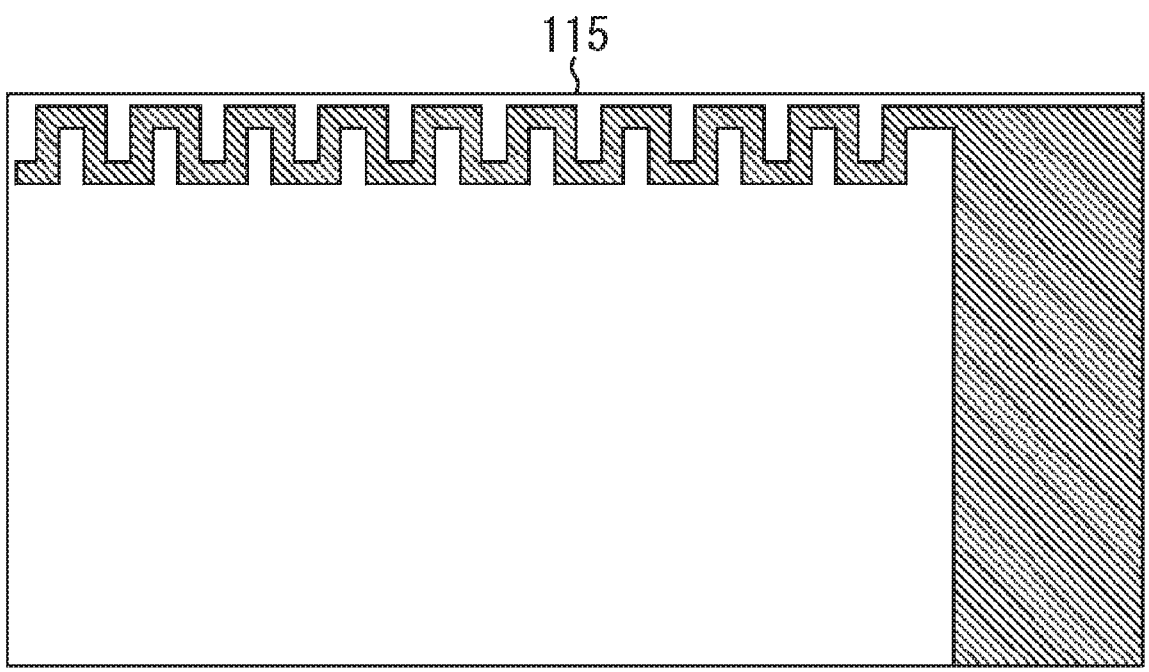
FIG. 34 is a diagram showing a wiring example of a GPS antenna.

FIG. 34 is a diagram showing a wiring example of the GPS antenna 115.

Figure 35:
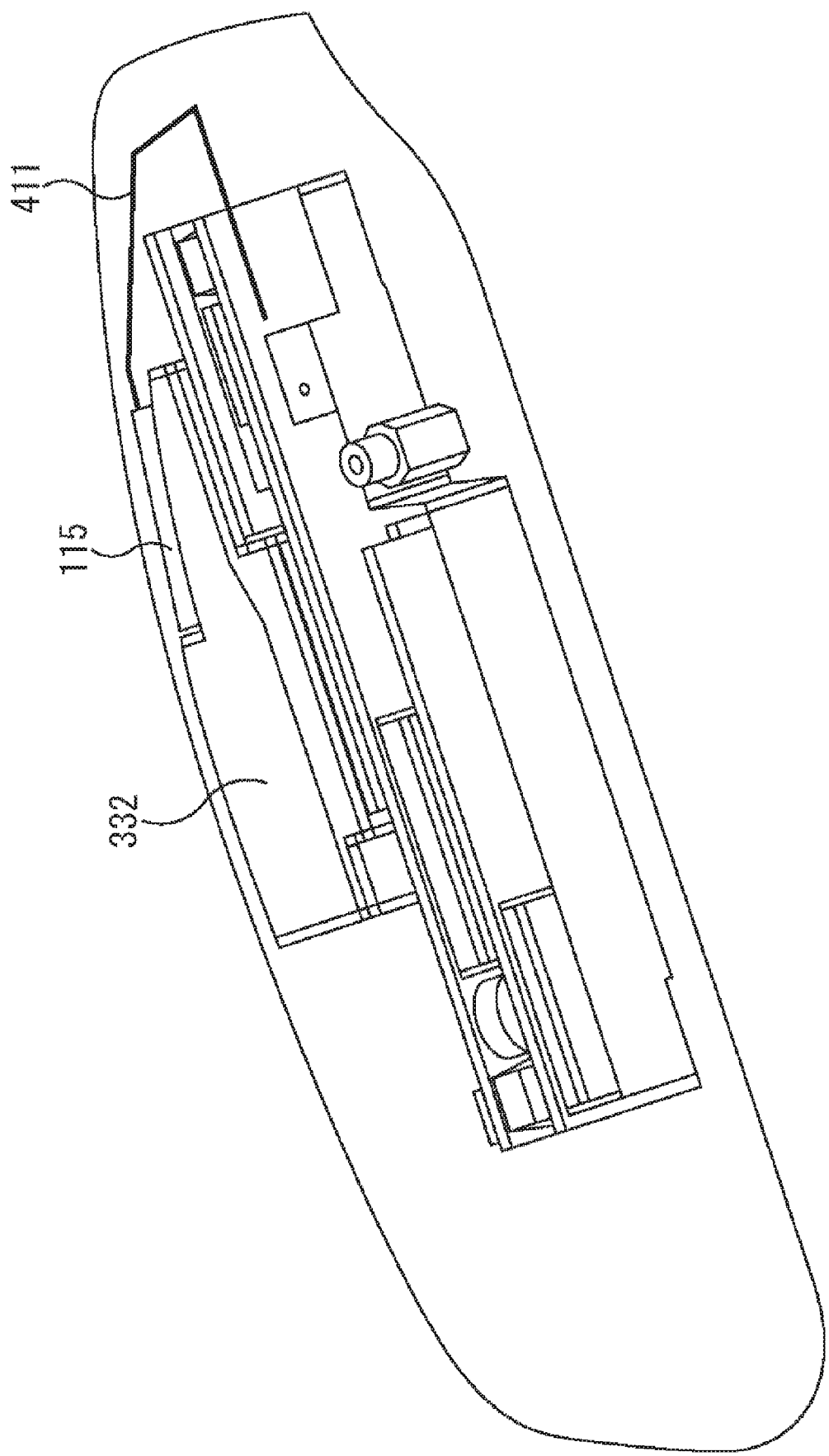
FIG. 35 is a diagram showing a connection example of the GPS antenna.

As shown in FIG. 34, the GPS antenna 115 is constituted of an FPC (Flexible Printed Circuits) including a meander wiring portion and a capacity loading portion. The GPS antenna 115 having such a configuration is arranged at a position closer to the side surface of the information processing terminal 1 than the speaker box 332 as shown in FIG. 35. The GPS antenna 115 and the substrate 402 of the substrate block 334 are connected by a wiring 411, and GND of the substrate 402 is used as an antenna ground plane.

Figure 36:
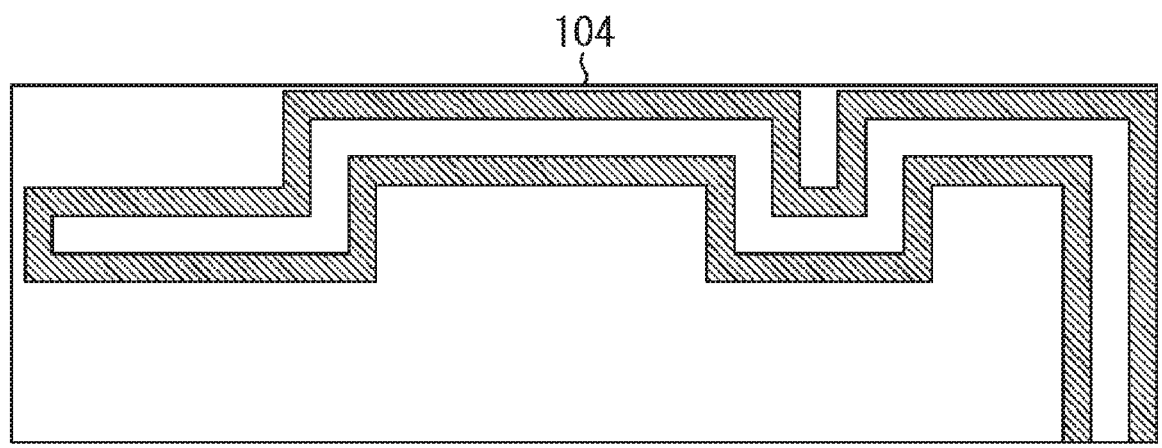
FIG. 36 is a diagram showing a wiring example of a BT/Wi-Fi antenna.

FIG. 36 is a diagram showing a wiring example of the BT/Wi-Fi antenna 104.

Figure 37:
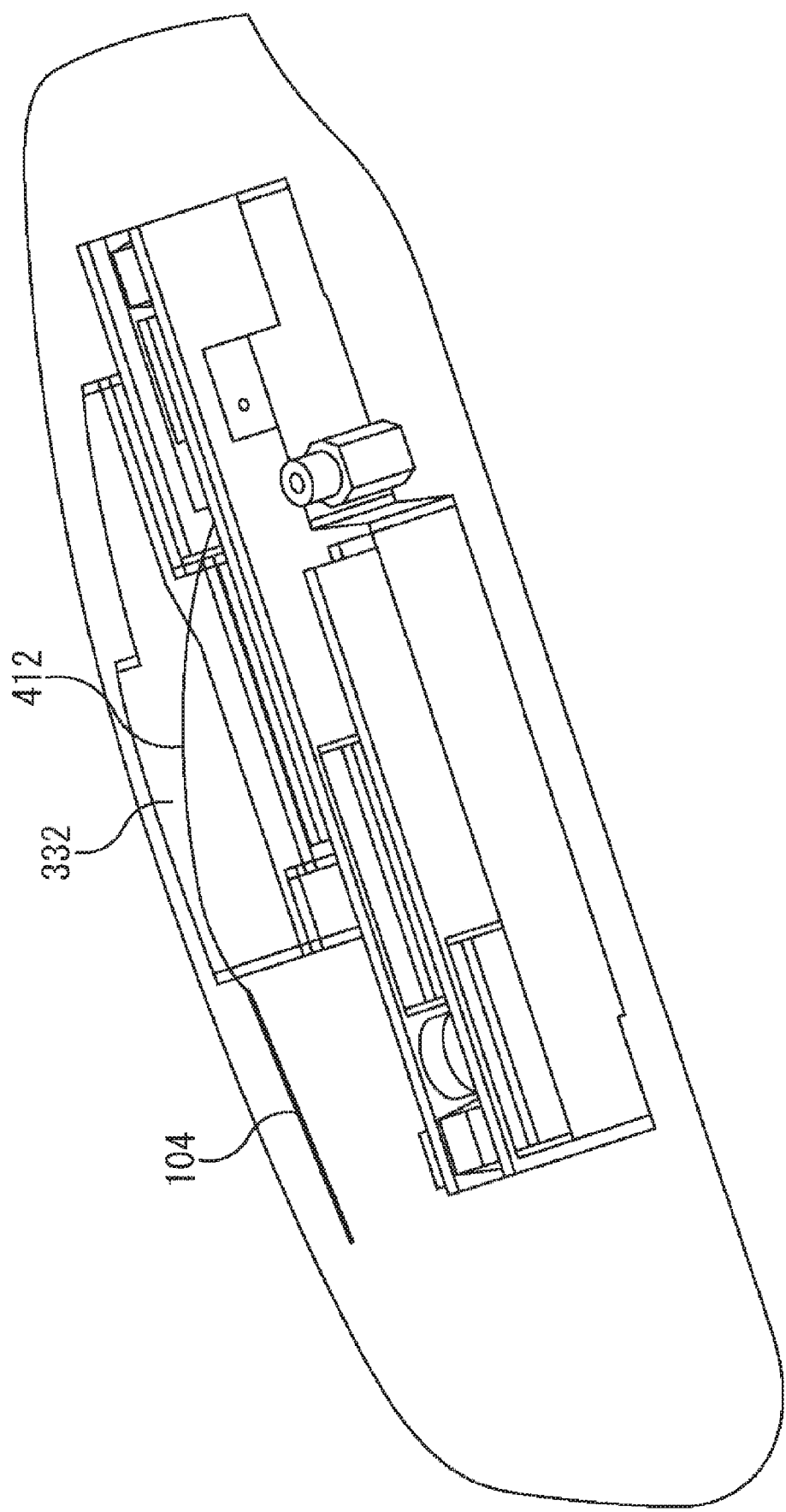
FIG. 37 is a diagram showing a connection example of the BT/Wi-Fi antenna.

As shown in FIG. 36, the BT/Wi-Fi antenna 104 is constituted of an FPC including a U-turn-type wiring. As shown in FIG. 37, the BT/Wi-Fi antenna 104 having such a configuration is provided at a position close to the side surface of the information processing terminal 1 while being deviated from the speaker box 332. A GND portion of the FPC constituting the BT/Wi-Fi antenna 104 is adhered onto the speaker box 332 to be used as an antenna ground plane. The BT/Wi-Fi antenna 104 and the substrate 402 of the substrate block 334 are mutually connected by a coaxial wire 412, and power is supplied through the coaxial wire 412.

7. Others

<7-1. Configuration Example of Computer>

The series of processing described above can be executed either by hardware or software. When executing the series of processing by software, programs configuring the software are installed in a computer incorporated into dedicated hardware, a general-purpose personal computer, or the like from a program recording medium.

Figure 38:
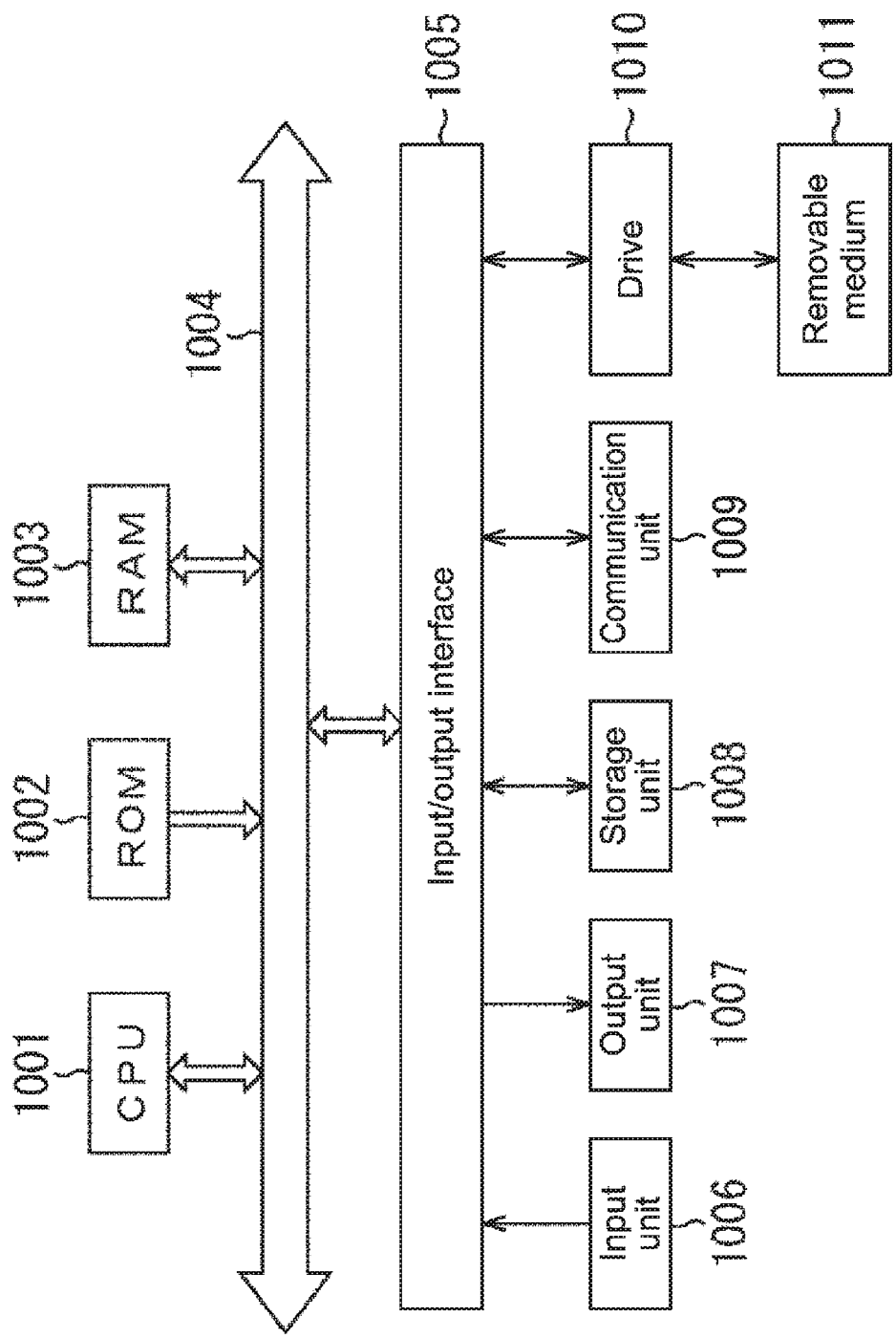
FIG. 38 is a block diagram showing a configuration example of a computer.

FIG. 38 is a block diagram showing a configuration example of hardware of a computer that executes the series of processing by programs.

A CPU 1001, a ROM 1002, and a RAM 1003 are connected to one another via a bus 1004.

An input/output interface 1005 is further connected to the bus 1004. Connected to the input/output interface 1005 are an input unit 1006 constituted of a keyboard, a mouse, and the like and an output unit 1007 constituted of a display, a speaker, and the like. Also connected to the input/output interface 1005 are a storage unit 1008 constituted of a hard disk, a nonvolatile memory, and the like, a communication unit 1009 constituted of a network interface and the like, and a drive 1010 that drives a removable medium 1011.

In the computer configured as described above, the CPU 1001 carries out the series of processing described above by loading the programs stored in the storage unit 1008 to the RAM 1003 via the input/output interface 1005 and the bus 1004 and executing them, for example.

The programs to be executed by the CPU 1001 are recorded onto the removable medium 1011 or provided via wired or wireless transmission media such as a local area network, the Internet, and digital broadcast to be installed in the storage unit 1008, for example.

It should be noted that the programs to be executed by the computer may be programs in which processes are carried out in time series in the order described in the specification or programs in which the processes are carried out in parallel or at necessary timings such as when invoked. Further, the processing described above may be carried out by a plurality of computers cooperating with one another. One or a plurality of computers carrying out the processing described above configure a computer system.

It should be noted that the system used in the specification refers to an assembly of a plurality of constituent elements (apparatuses, modules (components), etc.), and whether all the constituent elements are accommodated in the same casing is irrelevant. Therefore, a plurality of apparatuses that are accommodated in different casings and connected to one another via a network and a single apparatus in which a plurality of modules are accommodated in one casing are both referred to as system.

An embodiment of the present technology is not limited to the embodiments described above and can be variously modified without departing from the gist of the present technology.

For example, the present technology may take a cloud computing configuration in which one function is assigned to and processed by a plurality of apparatuses cooperating with one another via a network.

Moreover, the steps described above with reference to the flowchart can not only be executed by one apparatus but also be assigned to and executed by a plurality of apparatuses.

Furthermore, when a plurality of processes are included in one step, the plurality of processes included in that one step can not only be executed by one apparatus but also be assigned to and executed by a plurality of apparatuses.

<7-2. Combination Example of Configurations>

The present technology can also take the following configurations.

(1)

An information processing apparatus including;

an acquisition unit configured to acquire activity information associated with a user situation; and a control unit configured to control a capture angle of an image based on the activity information associated with the user situation, wherein the acquisition unit and the control unit are each implemented via at least one processor.

(2)
The information processing apparatus according to (1),
wherein the control unit is further configured to control the capture angle of the image by varying at least one of an angle of a lens of an imager configured to capture the image and a focal distance of the lens.

(3)
The information processing apparatus according to (1) or (2),
wherein the acquisition unit is further configured to acquire the user situation on the basis of a detection result obtained by a sensor.

(4)
The information processing apparatus according to any of (1) to (3), further including the sensor, wherein the information processing apparatus further includes a terminal worn on a part of the user, the part being lower than a head of the user.

(5)
The information processing apparatus according to any of (1) to (4), wherein the information processing apparatus further includes a casing configured by connecting units on both sides of the information processing apparatus with a curved band and is worn by being hung on a neck of the user.

(6)
The information processing apparatus according to any of (1) to (5), further including an imager configured to capture at least a front view being seen from the user wearing the information processing apparatus.

(7)
The information processing apparatus according to any of (1) to (6), wherein the control unit is further configured to control the capture angle of the image by varying an angle of a lens of the imager arranged on an inner side of an opening formed in a casing.

(8)
The information processing apparatus according to any of (1) to (7), wherein the control unit is further configured to control the imager not to expose the lens from the opening when not performing imaging.

(9)
The information processing apparatus according to any of (1) to (8), wherein the control unit is further configured to control the capture angle of the image by varying a cut out image region from the image.

(10)
The information processing apparatus according to any of (1) to (9), wherein the user situation further includes at least a standing state and a vehicle-riding state.

(11)
The information processing apparatus according to any of (1) to (10), wherein the user situation further includes a walking state as the standing state.

(12)
The information processing apparatus according to any of (1) to (11), wherein the user situation further includes a state where the user is riding a bicycle as the vehicle-riding state.

(13)
The information processing apparatus according to any of (1) to (12), wherein the control unit is further configured to control the capture angle of the image based on a posture of the information processing apparatus.

(14)
The information processing apparatus according to any of (1) to (13), wherein the control unit is further configured to control the capture angle of the image based on a wearing position of the information processing apparatus.

(15)
The information processing apparatus according to any of (1) to (14), wherein the control unit is further configured to control the capture angle of the image based on a movement velocity of the information processing apparatus.

(16)
The information processing apparatus according to any of (1) to (15), wherein the sensor includes an inertial sensor.

(17)
The information processing apparatus according to any of (1) to (16), wherein the control unit is further configured to control the capture angle of the image to be a predetermined number of degrees above a reference angle sensed by the inertial sensor,
wherein the predetermined number of degrees being different depending on the user situation.

(18)
The information processing apparatus according to any of (1) to (17), wherein the reference angle corresponds to a gravity acceleration direction.

(19)
The information processing apparatus according to any of (1) to (18),
wherein the sensor includes a biological sensor.

(20)
A control method, the method being executed via at least one processor, and including:
acquiring activity information associated with a user situation; and controlling a capture angle of an image based on the activity information associated with the user situation.

(21)
A non-transitory computer-readable storage medium storing a program which, when executed by a computer, causes the computer to execute a method, the method including:
acquiring information associated with a user situation; and
controlling an angle of an image based on the information associated with the user situation.

(22)
An information processing apparatus, including:
an acquisition unit that acquires behavioral state information indicating a behavioral state of a user; and
a control unit that controls an angle of view of an acquired image according to the behavioral state information.

(23)
The information processing apparatus according to (22), in which the control unit controls the angle of view by varying at least one of an angle of a lens of a photographing unit that photographs the image and a focal distance of the lens.

(24)
The information processing apparatus according to (22) or (23), in which the acquisition unit acquires the behavioral state of the user on the basis of a detection result obtained by a sensor.

(25)
The information processing apparatus according to (24), further including the sensor,
in which the information processing apparatus is a terminal worn on a part of the user, the part being lower than a head of the user.

(26)
The information processing apparatus according to (25), in which the information processing apparatus includes a casing configured by connecting units on both sides by a curved band and is worn by being hung from a neck of the user.

(27)

The information processing apparatus according to any one of (22) to (26), further including a photographing unit that includes a front direction of the user in a photographing direction, the front direction seen from the user wearing the information processing apparatus.

(28)

The information processing apparatus according to (27), in which the control unit controls the angle of view by varying an angle of a lens of the photographing unit arranged on an inner side of an opening formed in a casing.

(29)

The information processing apparatus according to (28), in which the control unit controls the photographing unit not to expose the lens from the opening when not performing photographing.

(30)

The information processing apparatus according to (22), in which the control unit controls the angle of view by varying a cutout range of a photographed image.

(31)

The information processing apparatus according to any one of (22) to (30), in which the control unit controls the angle of view according to the behavioral state including at least an upright state and a vehicle-riding state.

(32)

The information processing apparatus according to (31), in which the behavioral state includes a walking state as the upright state.

(33)

The information processing apparatus according to (31), in which the behavioral state includes a state where the user is riding a bicycle as the vehicle-riding state.

(34)

The information processing apparatus according to any one of (22) to (33), in which the control unit controls the angle of view also on the basis of a posture of the information processing apparatus.

(35)

The information processing apparatus according to any one of (22) to (34), in which the control unit controls the angle of view also on the basis of a wearing position of the information processing apparatus.

(36)

The information processing apparatus according to any one of (22) to (35), in which the control unit controls the angle of view also on the basis of a movement velocity of the information processing apparatus.

(37)

The information processing apparatus according to (25), in which the sensor is an inertial sensor.

(38)

The information processing apparatus according to (25), in which the sensor is a biological sensor.

(39)

A control method, including:

acquiring behavioral state information indicating a behavioral state of a user; and controlling an angle of view of an acquired image according to the behavioral state information.

(40)

A program that causes a computer system to execute processing including the steps of:

acquiring behavioral state information indicating a behavioral state of a user; and controlling an angle of view of an acquired image according to the behavioral state information.

REFERENCE SIGNS LIST

1 information processing terminal
11 band portion
12 right-hand side unit
13 left-hand side unit
52 camera module
101 application processor
131 behavioral state acquisition unit
132 angle-of-view control unit
133 photograph control unit 133

The invention claimed is:

1. An information processing apparatus, comprising:
a sensor configured to detect an external environment of the information processing apparatus and a situation of the information processing apparatus,
wherein the sensor includes an inertial sensor configured to detect a reference angle; and
at least one processor configured to:
acquire a user situation based on a detection result of the sensor;
acquire activity information associated with the user situation; and
adjust a capture angle of an image to a specific number of degrees above the reference angle based on the activity information associated with the user situation.

2. The information processing apparatus according to claim 1, further comprising an imager configured to capture the image, wherein the at least one processor is further configured to adjust the capture angle of the image based on a variation in at least one of an angle of a lens of the imager or a focal distance of the lens.

3. The information processing apparatus according to claim 1, further comprising a terminal that is wearable on a part of a user, wherein the part of the user is lower than a head of the user.

4. The information processing apparatus according to claim 3, further comprising a casing and a curved band, wherein
the casing includes connecting units on both sides of the curved band, and
the information processing apparatus is wearable around a neck of the user.

5. The information processing apparatus according to claim 1, further comprising an imager configured to capture the image, wherein the image corresponds to a front view that is viewable by a user of the information processing apparatus.

6. The information processing apparatus according to claim 5, further comprising a casing that includes an opening, wherein
the at least one processor is further configured to adjust the capture angle of the image based on a variation in an angle of a lens of the imager, and
the lens of the imager is on an inner side of the opening.

7. The information processing apparatus according to claim 6, wherein the at least one processor is further configured to control the imager to hide the lens from the opening when imaging is not executed by the imager.

8. The information processing apparatus according to claim 1, wherein the user situation includes at least one of an upright state or a vehicle-riding state.

9. The information processing apparatus according to claim 8, wherein the upright state is a walking state.

10. The information processing apparatus according to claim 8, wherein the vehicle-riding state is a bicycle-riding state of a user.

11. The information processing apparatus according to claim 1, wherein the at least one processor is further configured to adjust the capture angle of the image based on a posture of the information processing apparatus.

12. The information processing apparatus according to claim 1, wherein the at least one processor is further configured to adjust the capture angle of the image based on a wearing position of the information processing apparatus.

13. The information processing apparatus according to claim 1, wherein the at least one processor is further configured to adjust the capture angle of the image based on a movement velocity of the information processing apparatus.

14. The information processing apparatus according to claim 1, wherein the reference angle corresponds to a gravity acceleration direction.

15. The information processing apparatus according to claim 1, wherein the sensor further includes a biological sensor.

16. A control method, comprising:
in an information processing apparatus that includes at least one processor and a sensor:
detecting, by the sensor, an external environment of the information processing apparatus and a situation of the information processing apparatus, wherein the sensor includes an inertial sensor;
detecting, by the inertial sensor, a reference angle;
acquiring, by the at least one processor, a user situation based on a detection result of the sensor;
acquiring, by the at least one processor, activity information associated with the user situation; and
adjusting, by the at least one processor, a capture angle of an image to a specific number of degrees above the reference angle based on the activity information associated with the user situation.

17. The information processing apparatus according to claim 1, wherein the at least one processor is further configured to adjust the capture angle of the image based on one of an increase or a decrease of a range of a frame associated with a cut out image region of the image.

* * * * *